(12) United States Patent
Jacoby et al.

(10) Patent No.: US 12,189,142 B2
(45) Date of Patent: Jan. 7, 2025

(54) VARIABLE FOCUSING POWER OPTICAL DEVICES

(71) Applicant: ADLENS LTD, Eynsham (GB)

(72) Inventors: Thomas Norman Llyn Jacoby, Eynsham (GB); Simon Peter Horrocks, Eynsham (GB); Daniel Paul Rhodes, Eynsham (GB); Robert Edward Stevens, Eynsham (GB)

(73) Assignee: ADLENS LIMITED, Eynsham (GB)

( * ) Notice: Subject to any disclaimer, the term of this patent is extended or adjusted under 35 U.S.C. 154(b) by 1008 days.

(21) Appl. No.: 17/043,207

(22) PCT Filed: Mar. 28, 2019

(86) PCT No.: PCT/GB2019/050907
§ 371 (c)(1),
(2) Date: Sep. 29, 2020

(87) PCT Pub. No.: WO2019/186183
PCT Pub. Date: Oct. 3, 2019

(65) Prior Publication Data
US 2021/0026045 A1     Jan. 28, 2021

(30) Foreign Application Priority Data
Mar. 29, 2018   (GB) ..................... 1805289

(51) Int. Cl.
*G02B 3/14*     (2006.01)
*G02B 26/00*   (2006.01)
(Continued)

(52) U.S. Cl.
CPC ............ *G02B 3/14* (2013.01); *G02B 26/004* (2013.01); *G02B 27/0172* (2013.01); *G02C 7/085* (2013.01); *G02B 2027/0178* (2013.01)

(58) Field of Classification Search
CPC .... G02B 3/14; G02B 26/004; G02B 27/0172; G02B 2027/0178; G02C 7/085
(Continued)

(56) References Cited

U.S. PATENT DOCUMENTS 5,371,629 A * 12/1994 Kurtin ...................... G02B 3/14
                                                      351/158
5,999,328 A * 12/1999 Kurtin .................... G02C 7/085
                                                      359/666
(Continued)

FOREIGN PATENT DOCUMENTS

CN          105122091 A      12/2015
CN          104508541 B      10/2016
(Continued)

OTHER PUBLICATIONS

Son, Hyung-Min, et al., New variable focal liquid lens system using antagonistic-type SMA actuator, Proceedings of the 4th International Conference on Autonomous Robots and Agents, Feb. 10-12, 2019, Wellington, New Zealand, pp. 476-479.
(Continued)

*Primary Examiner* — Sharrief I Broome
(74) *Attorney, Agent, or Firm* — Haynes and Boone, LLP

(57) ABSTRACT

A variable focusing power fluid-filled lens or minor assembly (100*a*) comprising a fluid-filled envelope and a supporting structure (18) therefor; the fluid-filled envelope being constituted by a first wall that is formed of a distensible elastic membrane (15) having an exterior optical surface (151) of variable focusing power, a second wall (183) that is spaced from the first wall on a z-axis which is generally perpendicular to the membrane, and a collapsible peripheral side wall (17) that extends between the first and second walls (15, 183), and being filled with a substantially incompress-
(Continued)

ible fluid (16); a membrane holding structure (14) that is attached to a peripheral edge of membrane for holding the membrane under tension, the membrane holding structure defining a plurality of discrete control points spaced around the peripheral edge of membrane where the position of the peripheral edge of the membrane relative to the second wall on the z-axis is controlled and permitting bending of the peripheral edge of the membrane between the control points in a plane defined by the z-axis and a tangent to the peripheral edge of the membrane; the plurality of control points including a plurality of dynamic actuation points; and an actuation mechanism for displacing the edge of the membrane on the z-axis relative to the second wall at each of the actuation points to control the shape of the membrane; wherein the actuation mechanism comprises a plurality of first cam members (5, 6, 7, 8) that are connected to the membrane holding structure and associated with respective actuation points, a cam belt disposed circumjacent the membrane which comprises a plurality of spaced second cam members (2, 101), each second cam member being engaged with a corresponding one of the first cam members for controlling the position of the edge of the membrane on the z-axis at the respective actuation point, a cam belt support (19) that supports the cam belt for bidirectional rotation around the z-axis relative to the membrane and a coupling (102) for drivably connecting the cam belt to a selectively operable driver (103).

26 Claims, 13 Drawing Sheets

(51) Int. Cl.
  *G02B 27/01* (2006.01)
  *G02C 7/08* (2006.01)
(58) Field of Classification Search
  USPC .......................................... 359/648, 665, 666
  See application file for complete search history.

(56) References Cited

U.S. PATENT DOCUMENTS

| | | | |
|---|---|---|---|
| 9,874,664 B2 | 1/2018 | Stevens et al. | |
| 2003/0095336 A1* | 5/2003 | Floyd ..................... | G02C 7/085 351/159.68 |
| 2011/0085131 A1* | 4/2011 | Gupta ..................... | G02C 7/085 351/159.6 |
| 2015/0055084 A1* | 2/2015 | Stevens ..................... | G02B 3/14 359/666 |
| 2015/0116656 A1* | 4/2015 | Stevens ..................... | G02B 3/14 359/666 |
| 2020/0341172 A1* | 10/2020 | Stevens .................. | G02C 7/085 |

FOREIGN PATENT DOCUMENTS

| | | |
|---|---|---|
| JP | 2006106488 A | 4/2006 |
| WO | 2013144592 A1 | 10/2013 |

OTHER PUBLICATIONS

International Search Report and Written Opinion for PCT/GB2019/050907 dated Sep. 3, 2019, 22 pages.
Office Action in Taiwan Apln. No. 108111229 dated Aug. 30, 2023, 6 pages (with English translation).

* cited by examiner

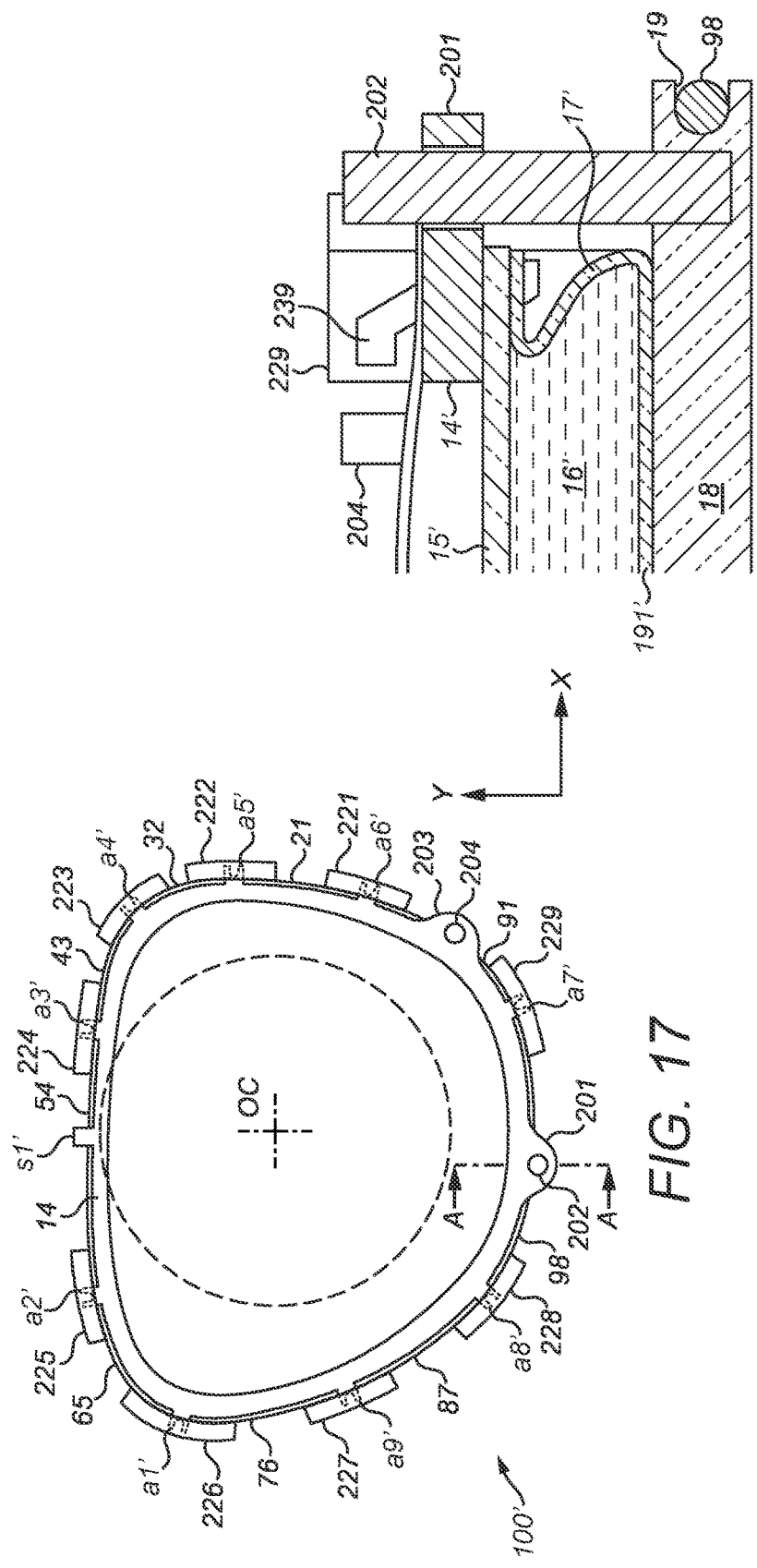
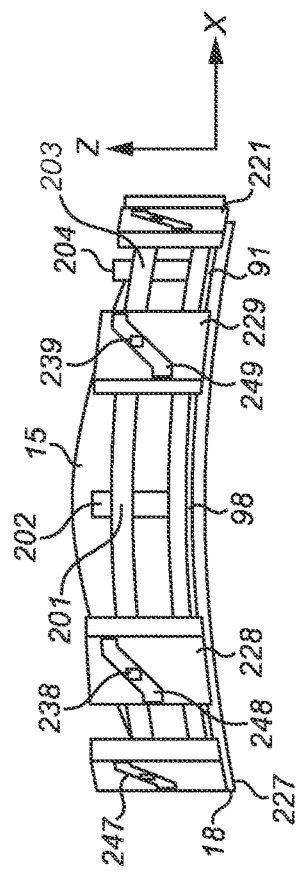
FIG. 17
FIG. 18
FIG. 19

A:A

Perspective Section

B:B Detail 1

VARIABLE FOCUSING POWER OPTICAL DEVICES

CROSS REFERENCE TO RELATED APPLICATION

This application is a 35 U.S.C. 371 National Phase Entry Application from PCT/GB2019/050907, filed Mar. 28, 2019, which claims priority to United Kingdom Patent Application No. 1805289.4, filed Mar. 29, 2018, the disclosures of which are incorporated herein in their entirety by reference, and priority is claimed to each of the foregoing.

FIELD OF THE INVENTION

The present invention relates to variable focusing power optical devices such as variable optical power lenses and mirrors, and has particular reference to variable focusing power optical devices of the kind having an optical surface formed by a distensible membrane that forms one wall of a fluid-filled envelope of adjustable fluid pressure to cause the membrane to distend outwardly or inwardly, thereby changing the focusing power of the optical surface. The invention also relates to a membrane assembly comprising such a distensible membrane for use in devices of the aforementioned kind. The invention further relates to corrective eyewear, AR/VR apparatus and other types of eyewear including at least one, and typically more, optical devices according to the invention.

BACKGROUND TO THE INVENTION

U.S. Pat. No. 5,999,328 A discloses an actuating system for liquid-filled variable focus lenses of the type where the focus is adjusted by changing the spacing between a rigid lens and a circular distensible membrane. The actuating system involves a finger-operated positioner which drives an elongated flexible actuating member in compression, i.e. a thin band, which is supported in a channel to prevent compression buckling. The band drives one or more actuators which are located around the periphery of the lens on which provide a mechanical advantage so that the motion of the finger-operated positioner is in a comfortable range. The distensible membrane is stretched over a ring and secured in place with an epoxy bead. At the location of each actuator, the lens assembly is retained between a rear cover and a cam follower that rides on a cam which is spot welded or otherwise fastened onto the band. The cam follower rides in a recess in a frame which restricts cam follower motion to a direction at right angles to the plane of the lens assembly and therefore, as the cam follower rides up the cam, the lens is squeezed and the membrane distends. Ordinarily, the actuators move the ring an equal amount, and the distensible membrane remains substantially parallel to the rigid lens as it moves. However, one or two actuators may be replaced by hinges so that the ring moves angularly with respect to the rigid lens instead of moving in a translational mode. The liquid-filled variable focus lenses of U.S. Pat. No. 5,999,328 A are circular and arranged to deform spherically. No consideration is given as to how to actuate a non-round lens or how to actuate a lens non-spherically, e.g. spherocylindrically.

WO 2013/144592 A1, the contents of which are incorporated herein by reference, discloses a fluid-filled lens or mirror assembly of variable focusing power in which an elastic membrane is held under tension around its edge by a flexible membrane supporting member. The membrane may be round or non-round, and the membrane supporting member is coupled to a fixed support at a plurality of discrete control points round the supporting member by respective engaging members for controlling the position of the membrane edge relative to the fixed support at the control points. This allows the boundary of the membrane to form a projection of itself onto multiple spheres or toroids as shown in FIGS. 1A and 1B of the accompanying drawings.

Whilst the lens or mirror assembly of WO 2013/144592 A1 achieves acceptable results, an ongoing problem associated with liquid lenses, particularly non-round lenses, is the need to create an adjustable lens with good optics. "Good" in an adjustable ophthalmic lens typically means that the adjustable optical surface is spherical or spherocylindrical, or nearly so.

Note, in relation to coordinates and directions as used herein, that the undeformed membrane plane is used to define Cartesian axes (x,y,z), where x-y lie in the plane of the membrane when flat, with z along the optical axis. In cylindrical polar coordinates z also lies on the optical axis and the membrane in the sweep of the coordinates r-φ (where φ is azimuth). Also defined is an "along track" coordinate s. s is the distance around the eye-shape from azimuthal zero. The (x,y)-plane here defined may be referred to as the membrane plane even when the membrane is in a distended spherical state.

For membranes that form variable curvature surfaces in a sealed compression lens, a theoretical volume-conserving neutral contour will exist that is common across membrane states. The neutral contour is defined by the intersection of a datum plane with the membrane, such that the volume bounded by the datum plane and membrane is equal above and below the datum plane. In other words, the fluid volume inside the neutral contour is equal to that displaced outside of it. The centre of the neutral contour is both the point of maximum distension of the membrane and the optical centre (hereafter OC) of the membrane. For variable curvature spherical surfaces the neutral contour is circular whereas for toric surfaces, the neutral contour is ellipse.

Spherical-refractive optical performance at each actuation state is dependent on shaping the boundary to the ideal projection onto the sphere as mentioned above. A way of achieving these spherical projections in a compression lens is to hold some points around the boundary at fixed heights (hereafter static control points or hinge points) while moving others in the z-direction (active or dynamic control points). For spherical surfaces, the static control points lie on the intersection of the neutral circle and the boundary. Similar conditions apply to astigmatic lenses where the boundary is projected onto toric surfaces. The optical architect is assisted in designing for an arbitrary eye-shape if (s)he can put active control points at any arbitrary position around the lens. This may be difficult in practice, however.

For example, a lens assembly of the kind disclosed by WO 2013/144592 A1 has a neutral circle that intersects the eye-shape as shown in FIG. 2, which enable one to put fixed-z, static control points S there, while three active control points A at the temple are moved by a cam actuator located at that side. As mentioned above, this lens assembly performs generally satisfactorily, but in the absence of active control at the nose, there is a requirement for improved optics in that region. The lens assembly of WO 2013/144592 A1 has a cam actuator located at the temple that acts on three control points there. Whilst this lens assembly performs generally satisfactorily, the location of the OC is such that there is a requirement for improved optics in a region near the nose.

Maximal optical performance is achieved by shaping the boundary to the ideal projection onto the sphere. In general, it is found that the more control points there are on the boundary, and the less they are spaced apart, the closer one is be able to get to the ideal projection and the better the optics.

SUMMARY OF THE INVENTION

According to a first aspect of the present invention therefore, there is provided a variable focusing power fluid-filled lens or mirror assembly comprising a fluid-filled envelope and a supporting structure therefor. The fluid-filled envelope may constituted by a first wall that is formed of a distensible elastic membrane having an exterior optical surface of variable focusing power, a second wall that is spaced from the first wall on a z-axis which is generally perpendicular to the membrane, and a collapsible peripheral side wall that extends between the first and second walls. The fluid-filled lens or mirror assembly may be filled with a substantially incompressible fluid. The fluid-filled lens or mirror assembly may comprise a membrane holding structure that is attached to a peripheral edge of membrane for holding the membrane under tension, the membrane holding structure defining a plurality of discrete control points spaced around the peripheral edge of membrane where the position of the peripheral edge of the membrane relative to the second wall on the z-axis is controlled and permitting bending of the peripheral edge of the membrane between the control points in a plane defined by the z-axis and a tangent to the peripheral edge of the membrane. The plurality of control points may include a plurality of dynamic actuation points; and an actuation mechanism for displacing the edge of the membrane on the z-axis relative to the second wall at each of the actuation points to control the shape of the membrane. The actuation mechanism may comprise a plurality of first cam members that are connected to the membrane or membrane holding structure and associated with respective actuation points, a cam belt disposed circumjacent the membrane which comprises a plurality of spaced second cam members, each second cam member being engaged with a corresponding one of the first cam members for controlling the position of the edge of the membrane on the z-axis at the respective actuation point, a cam belt support that supports the cam belt for bidirectional rotation around the z-axis relative to the membrane and a coupling for drivably connecting the cam belt to a selectively operable driver. The cam belt may form a complete loop around the membrane.

Suitably, the membrane may have a spherical, spherocylindrical or other shape of variable curvature which is defined by one or more Zernike polynomials selected from $Z_k^{\pm j}$, wherein k is 2, 3 or 4 and j is 0 or an integer that is less than k. The variable focusing power fluid-filled lens or mirror assembly of the present invention may therefore be adapted for ophthalmic use, with the optical surface having a three-dimensional distended shape that is adapted to correct refractive errors and/or presbyopia.

Suitably, each first cam member may comprise a cam follower. Each second cam member may comprise at least one cam surface. The cam follower and cam surface may be configured such that rotation of the cam belt causes or allows displacement of the cam follower on the z-axis.

In some embodiments, the cam belt may comprise a plurality of cam plates that are interconnected by tension members to form a complete loop circumjacent the peripheral edge of the membrane. Each cam plate may comprise one or more cam surfaces. Suitably, the cam belt is tensioned such that it forms a close fit around the cam belt support without any substantial slack. Typically, the cam belt support has a circumferential outwardly facing side surface that supports the cam belt. It will be understood that the cam belt should not be over-tightened so as to resist rotation of the belt as required or to cause damage to the lens or mirror assembly. Thus, the supporting structure may have a peripheral side surface that bears the cam belt. The side surface may be formed with a circumferential groove that accommodates and locates the tension members.

In some embodiments, the cam belt may comprise a plurality of circumferentially spaced teeth, each of which defines a cam surface. The cam belt may comprise a plurality of circumferentially spaced teeth that engage the corresponding first cam members at substantially regular intervals around the entirety of the peripheral edge of the membrane. In some embodiments, the spacing between adjacent teeth may be sufficiently small as to minimise uncontrolled bending of the peripheral edge of the membrane therebetween.

In some embodiments, at least two of the cam surfaces may be configured differently for causing or allowing differential displacement of the peripheral edge of the membrane on the z-axis at the corresponding actuation points.

In some embodiments, the control points may further comprise one or more static control points (e.g. hinge points) where the peripheral edge of the membrane is held at a substantially fixed distance from the second wall on the z-axis.

Typically, the supporting structure may comprise a hard member that is spaced from the first wall. The hard member may have an interior surface that forms or supports the second wall of the fluid-filled envelope. The hard member may have a peripheral outer side surface that bears the cam belt.

In some embodiments, the membrane holding structure may comprise a bendable support ring that defines a datum x,y-plane which is generally perpendicular to the z-axis. The bendable support ring may comprise a plurality of spaced actuating tabs, each actuating tab forming or carrying a respective first cam member. The bendable support ring may be unsupported and thus free to bend between adjacent control points. The supporting structure and bendable support ring may be interconnected so as to allow displacement of the support ring on the z-axis and to prevent azimuthal rotation of the support ring about the z-axis.

Typically, a fluid-filled lens or mirror assembly in accordance with the first aspect of the invention may define an optical axis that is substantially parallel to the z-axis; the supporting structure may comprise a hard member that is spaced from the first wall, the hard member having an interior surface that forms or supports the second wall of the fluid-filled envelope; and the membrane holding structure may comprise a bendable support ring that comprises a plurality of spaced actuating tabs.

Thus, in some embodiments, the fluid-filled lens or mirror assembly may define an optical axis that is substantially parallel to the z-axis; the supporting structure may comprise a hard member that is spaced from the first wall, the hard member having an interior surface that forms or supports the second wall of the fluid-filled envelope; and the membrane holding structure may comprise a bendable support ring that has a plurality of spaced actuating tabs, including one or more first actuating tabs that are operable using a first slidable cam plate which comprises one or more cam surfaces that engage with the one or more first actuating tabs such that reciprocating movement of the first cam plate relative to the support ring causes the first actuating tabs to move towards or away from the second wall in a direction substantially parallel to the optical axis, and one or more second actuating tabs which are located on the support ring at a location remote from the one or more first actuating tabs that are operated by a second slidable cam plate having a cam surface that engages with the second actuating tabs such that reciprocal movement of the second cam plate causes displacement of the one or more second actuating tabs towards or away from the second wall in a direction substantially parallel to the optical axis, the first and second slidable cam plates being interconnected by tension members that extend between the first and second slidable cam plates around the periphery of the lens assembly such that the tension members and first and second cam plates form a complete loop around the lens assembly.

In accordance with a second aspect of the present invention, therefore, there is provided a variable focusing power liquid lens assembly comprising a fluid-filled envelope having a first wall that is formed by a distensible membrane held around its periphery by a bendable support ring, a second wall that is provided by a surface of a hard member that is spaced from the first wall or a layer of material that is supported on the surface of the hard member and a collapsible side wall that extends between the first and second walls around the periphery of the fluid-filled envelope. The envelope may be filled with a substantially incompressible fluid. The pressure of the fluid within the envelope may be adjustable to cause the distensible membrane to distend outwardly or to retract inwardly. The distensible membrane may form an optical surface of variable focusing power as the shape of the membrane is changed. The lens assembly may define an optical axis that extends substantially orthogonally to a datum plane defined by the membrane in an undistended state and the support ring may comprise a plurality of actuating tabs that are placed at spaced actuation points around the periphery of the bendable support ring. Each of the actuating tabs may be movable towards or away from the second wall in a direction substantially parallel to the optical axis for controlling the shape of the support ring as the membrane is distended or relaxed. A first slidable cam plate may comprise one or more cam surfaces that engage with one or more first actuating tabs of the plurality of actuating tabs for operating the one or more first actuating tabs such that reciprocating movement of the first cam plate relative to the support ring causes the first actuating tabs to move towards or away from the second wall in a direction substantially parallel to the optical axis. A second slidable cam plate may comprise one or more cam surfaces that engage with one or more second actuating tabs of the plurality of actuating tabs which are located on the support ring at a location remote from the one or more first actuating tabs for operating the one or more second actuating tabs such that reciprocal movement of the second cam plate causes displacement of the one or more second actuating tabs towards or away from the second wall in a direction substantially parallel to the optical axis. Tension members may extend between the first and second slidable cam plates around the periphery of the lens assembly for connecting the first and second slidable cam plates such that the tension members and first and second cam plates form a complete loop around the lens assembly. Suitably, the arrangement may be such that active displacement of the support ring at each of the actuating tabs is mechanically linked for actuation of all of the actuating tabs by a single actuator.

Typically, two or more first actuating tabs may be positioned in a temple region of the support ring. At least one second actuating tab may be positioned in a nose region of the support ring. Each actuating tab may be associated with a separate respective sliding cam plate. In this way, the present invention may provide active control over the profile of the edge of the membrane in the nose region to provide a distensible membrane having a spherical or spherocylindrical optical surface of improved quality as compared with known variable focusing power liquid lens having a non-round eye-shape.

In some embodiments, the variable focusing power liquid lens assembly may comprise five or more, optionally 10 or more, sliding cam plates that are interlinked mechanically using the tension members to form a complete belt around the periphery of the hard member. The first slidable cam plate may be driven by a rack and pinion mechanism, in which the pinion forms a coupling that is arranged to be driven by an electric motor, either directly or through another pinion, or by a second rack. Optionally, the second rack may be driven by a linear actuator; optionally a solenoid or piezo-squiggle motor.

Suitably, the tension members may be arranged to slide in a groove formed in a peripheral side surface of the hard member or a part connected thereto.

In accordance with a third aspect of the present invention, there is provided a variable focusing power liquid lens assembly comprising a fluid-filled envelope having a first wall that is formed by a distensible membrane held around its periphery by a bendable support ring, a second wall that is provided by a surface of a hard member that is spaced from the first wall or a layer of material that is supported on the surface of the hard member and a collapsible side wall that extends between the first and second walls around the periphery of the fluid-filled envelope. The envelope may be filled with a substantially incompressible fluid. The pressure of the fluid within the envelope may be adjustable to cause the distensible membrane to distend outwardly or to retract inwardly. The distensible membrane may form an optical surface of variable focusing power as the shape of the membrane is changed. The lens assembly may define an optical axis that extends substantially orthogonally to a datum plane defined by the membrane in an undistended state. The support ring may comprise a plurality of actuating tabs that are placed at spaced actuation points around the periphery of the bendable support ring. Each of the actuating tabs may be movable towards or away from the second wall in a direction substantially parallel to the optical axis for controlling the shape of the support ring as the membrane is distended or relaxed. A toothed belt may form a complete loop around the lens assembly and comprise a plurality of teeth. Each tooth may be arranged to engage a corresponding one of the actuating tabs and may have a cam surface that is shaped to cause displacement of the corresponding actuating tab towards or away from the second wall in a direction substantially parallel to the optical axis. Suitably, the arrangement may be such that active displacement of the support ring at each of the actuating tabs is mechanically linked for actuation of all of the actuating tabs by a single actuator.

Typically, the cam surface of each tooth may be shaped individually and differently from one or more others, so that as the toothed belt is driven around the support ring, the actuating tabs may be driven differentially towards or away from the second wall for controlling the shape of the support ring as the membrane distends or contracts.

Suitably, one or more of the actuating tabs may extend through corresponding holes formed in the toothed belt to engage with one or more cooperating structures for preventing azimuthal rotation of the support ring upon operation of the toothed belt. Optionally, one or more of the holes in the toothed belt may have an escalator form having opposing cam surfaces. Actuating tabs that do not extend through the toothed belt may engage with a second inclined plane feature to be driven in a direction away from the hard member.

The toothed belt may conveniently be fabricated as a composite structure having a continuous, flexible outer part that is formed from a flexible elastomer and a plurality of circumferentially spaced inner parts, each of which is formed from a hard low friction material with one or more cam surfaces. Gaps may be provided between adjacent inner parts to allow the toothed belt to bend. The inner parts may further comprise a lip portion that is arranged to overlap partially with the outer surface of the hard member. The actuating tabs may be widely spaced around the support ring such that the support ring can bend in a plane defined by the optical axis and a tangent to the support ring between the actuating tabs. Advantageously, one or more actuating tabs may be positioned juxtaposed a temple side of the support ring, and a least one actuating tab may be positioned juxtaposed a nose side of the support ring. As described above, this affords positive control over the shape of the membrane, and thus the optical surface defined by the membrane, in the regional of a non-round eyes-shape that is arranged to be disposed in use juxtaposed the user's nose and which is typically highly curved, implying a need for greater control in that region. In some embodiments, for example, the support ring may have two or three actuating tabs positioned in the temple region of the support ring and one actuating tab positioned in the nose region of the support ring.

Thus, the support ring may typically comprise two or more, optionally five or more, actuating tabs that are positioned at actuation points spaced around the support ring. In some embodiments, there may be 2-10 actuating tabs, e.g. 9 or 10 actuating tabs, positioned at actuation points spaced around the support ring. In some embodiments, there may be 10 or more, optionally 20 or more, actuating tabs positioned at actuation points spaced around the support ring. In some embodiments, especially where the cam belt comprises a toothed belt of the kind described above, the support ring may have 20 to 50 actuating tabs, optionally about 30 or 40 actuating tabs, positioned around substantially the whole of the support ring.

Suitably, the support ring may be held at a substantially fixed distance from the second wall at one or more hinge points. Generally, the hinge points may be located at or near points on the supporting ring where a volume-conserving neutral contour on the membrane intersects the datum plane of the membrane, the volume-conserving neutral contour representing a boundary where the volume bounded by the datum plane and the membrane remains equal inside and outside the contour at all actuation states of the lens assembly. It will be understood that the volume-conserving neutral contour is theoretical and is not actually visible on the membrane. In the case of a membrane that distends spherically, the volume-conserving neutral contour is circular, whereas it is elliptical for spherocylindrically distending membranes surfaces, i.e. defined by a combination of sphere and astigmatic deformation.

Suitably, the one or more hinge points may be used to prevent rotation of the support ring around the optical axis. The variable focusing power liquid lens assembly may comprise means for preventing the support ring from rotating about the optical axis.

In some embodiments, the support ring may be substantially circular. Alternatively, the support ring may be substantially non-round. Non-round eye-shapes are especially required for use in corrective eyewear such as glasses as well as other eyewear such as augmented or virtual reality head-up displays or headsets.

Suitably, the pressure of the fluid within the envelope may be adjustable by compressing or expanding the envelope; optionally by displacing one or more regions of the support ring towards or away from the second wall. Alternatively, the pressure of fluid within the envelope may be adjustable by adding or withdrawing fluid to or from the envelope. In some embodiments, the pressure of fluid within the envelope may be adjustable by compressing or expanding the envelope and by adding or withdrawing fluid to or from the envelope as disclosed, for example, in co-pending International patent application no. PCT/GB2019/050131, the contents of which are incorporated herein by reference.

Typically, the hard member may comprise an optically clear plate or hard lens. The hard lens may have an opposite, outer optical surface having a defined focusing power. The membrane may also be optically clear, at least across a range of wavelengths in the visible spectrum. The incompressible fluid may comprises an optically clear refractive fluid. The present invention may therefore provide a variable focusing power liquid lens assembly in which light is transmitted through the membrane, fluid and hard member and is refracted at the optical surface of the membrane and outer optical surface of the hard plate. Alternatively, the present invention may provide a variable focusing power liquid mirror assembly in which the optical surface of the membrane is reflective, for example by means of a reflective coating. For use as a variable focusing power liquid mirror assembly, it is unnecessary for the components to be transparent.

In some embodiments, the variable focusing power liquid lens assembly may further comprise control electronics for operating a drive mechanism for actuating the actuating tabs. Such control electronics may include one or more sensors to provide feedback control for adjusting the pressure of the fluid in the envelope and the position of the actuating tabs to a desired focusing power of the membrane. The sensors optionally comprise one or more pressure sensors, temperature sensors, actuator position sensors, limit switches and/or curvature sensors.

Thus, in some embodiments, the variable focusing power liquid lens assembly of the present invention may comprise one or more sensors for determining the actuation state of the lens assembly.

In some embodiments, the control electronics may be operable to set the focusing power automatically. To that end, the variable focusing power liquid lens assembly may comprise an eye-tracking device to determine the point of gaze or vergence of a user; the control electronics being configured to adjust the focusing power of the lens assembly accordingly.

In accordance with certain aspects of the present invention, therefore, there is provided a variable focusing power liquid lens assembly comprising a distensible membrane that is held around its periphery by a bendable support ring. The support ring may be substantially circular or non-round. The distensible membrane forms a first wall of a fluid-filled envelope, a second wall of which is provided by a surface of substantially hard member that is spaced from the first wall, or a layer of material that is supported on the surface of the hard member. A collapsible side wall extends between the first and second walls around the periphery of the fluid-filled envelope, and the envelope is filled with a substantially incompressible fluid. Suitably, the incompressible fluid may comprise an optically clear refractive fluid.

As described above, in some embodiments, the hard member may comprise an optically clear plate or hard lens. The hard lens may have an opposite, outer optical surface having a defined focusing power.

The pressure of the fluid within the envelope is adjustable to cause the distensible membrane to distend outwardly or to retract inwardly. In some embodiments, the pressure of fluid within the envelope may be adjusted by adding or withdrawing fluid to or from the envelope, for example using a suitable fluid injector. In other embodiments, the pressure of the fluid within the envelope may be adjusted by compressing or expanding the envelope, for example by displacing one or more regions of the supporting ring towards or away from the second wall. In some embodiments, a combination of fluid-injection and compression may be used, as disclosed, for example, in co-pending International patent application no. PCT/GB2019/050131 mentioned above.

The distensible membrane thus forms an optical surface of variable focusing power as the shape of the membrane is changed. Meanwhile, the lens assembly may define an optical axis that extends as substantially orthogonal to a plane defined by the membrane when it is undistended.

As described above, the support ring may comprise a plurality of actuating tabs that are placed at spaced actuation points around the periphery of the bendable support ring. Each of the individual actuating tabs may be displaced towards or away from the second wall in a direction substantially parallel to the optical axis for controlling the shape of the support ring as the membrane is distended or relaxed. Advantageously, the actuating tabs may be widely spaced around the support ring. For instance, in some embodiments, one or more actuating tabs may be positioned juxtaposed a temple side of the support ring, and a least one actuating tab may be positioned juxtaposed a nose side of the support ring.

As described above, in some embodiments, the support ring may comprise 2-10 actuating tabs that are positioned at actuation points spaced around the support ring. For instance, in some embodiments, the support ring may have two or three actuating tabs positioned in the temple region of the support ring and one actuating tab positioned in the nose region of the support ring. In another embodiment, the support ring may have more than five actuating tabs, for example 9 or 10 actuating tabs positioned around the support ring. In a particular embodiment, the support ring may have a large number of actuating tabs positioned around substantially the whole of the support ring. For example, 20 to 50 actuating tabs, e.g., about 30 or 40 tabs.

In some embodiments, the support ring may be held at a substantially fixed distance from the second wall at one or more hinge points. As described above, the hinge points may be placed at or near points where the above-describe neutral circle intersects the eye shape defined by the supporting ring. Advantageously, the one or more hinge points may also be used to prevent rotation of the support ring around the optical axis, i.e. in azimuth.

In some embodiments, depending on the shape of the support ring, there may be no such passive hinge points. In such embodiments, alternative means may be provided for preventing the support ring from rotating about the optical axis. For instance, the support ring may be formed with one or more holes, each of which is shaped to accommodate a short pin that extends in a direction substantially parallel to the optical axis and is anchored at one end in the hard member or a part attached thereto, or to a suitable housing for the lens assembly. Suitably, the hole is shaped to accommodate the pin with a close tolerance, and the engagement of the pin with the support ring prevents movement of the support ring in azimuth.

Alternatively, one or more of the actuating tabs or other tabs formed on or attached to the support ring may engage one or more cooperating structures attached to the hard member or housing for preventing rotation of the support ring. Such cooperating structures may, for example, comprise, pairs of adjacent parallel posts that extend in a direction substantially parallel to the optical axis and are arranged to trap actuating or other tab therebetween to prevent azimuthal movement of the actuating or other tab, while allowing its movement in a direction parallel to the optical axis.

As described above, the bendable ring is suitably unsupported and free to bend passively between the actuation points and any hinge points.

It will be appreciated that differential displacement of the individual actuating tabs and/or the presence of one or more hinge points where displacement of the support ring towards or away from the second wall is prevented may result in bending of the support ring. Where the shape of the membrane is non-round, or the membrane is required to deform other than spherically—for example to include an element of astigmatism (cylinder)—this is important to ensure the membrane distends with the correct three-dimensional shape.

In accordance with the present invention, therefore, active displacement of the support ring at each of the actuating tabs is mechanically linked, so that a single actuator may be used to operate all of the actuating tabs. In some embodiments, a single actuator may be used to operate the actuating tabs in two or more lens assemblies in a pair of glasses or other eyewear product such, for example, as a virtual or augmented reality headset, that comprises at least one variable focusing power lens assembly in accordance with the invention that are arranged to be positioned in front of each one of a user's eyes.

As described above, in some embodiments, one or more first actuating tabs may be operated using a first slidable cam plate which comprises one or more cam surfaces that engage with the one or more first actuating tabs. Reciprocating movement of the first cam plate relative to the support ring may cause or allow the first actuating tabs to move towards or away from the second wall in a direction substantially parallel to the optical axis. Suitably, two or more first actuating tabs may be positioned in the temple region of the support ring.

Suitably the first slidable cam plate maybe driven by a rack and pinion mechanism, in which the pinion is arranged to be driven by an electric motor, either directly or through another pinion, or by a second rack. Such a second rack may in turn be driven by a linear actuator such, for example, as a solenoid or piezo-squiggle motor.

One or more second actuating tabs, which are suitably located on the support ring at a location distal from the one or more first actuating tabs, are operated by a second slidable cam plate having a cam surface that engages with the second actuating tabs, such that reciprocal movement of the second cam plate causes displacement of the one or more second actuating tabs towards or away from the second wall in a direction substantially parallel to the optical axis. Suitably, at least one second actuating tab may be positioned in the nose region of the support ring.

In accordance with the invention, the first and second slidable cam plates may be connected by tension members that extend between the first and second slidable cam plates around the periphery of the lens assembly, such that the tension members and first and second cam plates form a complete loop around the lens assembly. Suitably, the tension members may be arranged to run in a groove formed in a peripheral side surface of the hard member or a part connected thereto.

Suitably, each tension member has a small cross-section and is formed of a flexible, low-stretch material. Further, each tension member should be slidable in the groove. In some embodiments, each tension member may comprise a braided steel core with a low friction sheath. Suitably, the sheath may be formed from PTFE or some other low friction polymer. The hard member may be formed from any material that is known in the art for making hard lenses, such, for example, as polymer, glass, sapphire and the like.

In some embodiments, the side surface of the hard member may be formed with a groove that accommodates a low-friction insert which in turn is formed with a groove the receives the tension member. The insert and groove formed in the side surface of the hard member may be mutually configured to prevent the insert from coming out of its correct position. For instance, the inserting groove may be formed with interlocking "fishtail" features or the like. The material for the sheath of the tension member may suitably be chosen to be flexible, while the material for the insert may be chosen for its tribology with the sheath.

As mentioned above, in some embodiments, there may be 5, 10 or more actuating tabs formed around the support ring. In some embodiments, each individual actuating tab may be associated with a separate respective sliding cam plate. Thus, in some embodiments, there may be 5, 10 or more sliding cam plates which are interlinked mechanically in the manner described above using tension members to form a complete belt around the periphery of the hard member.

Where there are many actuating tabs, for example more than 10, e.g., 20 or more, the sliding cam plate may be replaced in accordance with the invention by a toothed belt in which each individual actuating tab is arranged to be engaged by a corresponding tooth on the belt having a cam surface that is shaped to cause or allow the displacement of the actuating tab towards or away from the second wall in a direction substantially parallel to the optical axis. The cam surface of each tooth may be shaped individually and differently from the others, so that as the toothed belt is driven around the support ring, the actuating tabs are driven differentially towards or away from the second wall for controlling the shape of the support ring as the membrane distends or contracts. As described above, one or more of the actuating tabs may extend through corresponding holes formed in the toothed belt to engage with one or more cooperating structures for preventing azimuthal rotation of the support ring upon operation of the toothed belt.

Where one or more of the actuating tabs are required to be driven away from the second wall, the holes in the toothed belt may take escalator form having opposing cam surfaces. Similarly, actuating tabs that do not extend through the toothed belt in this manner may engage with a second inclined plane feature where they are required to be driven in a direction away from the hard member.

Suitably, the toothed belt is fabricated as a composite structure having a continuous, flexible outer part that is formed from a flexible elastomer such, for example, as natural rubber, TPU, silicone or the like, and a plurality of circumferentially spaced inner parts, each of which is formed with one or more cam surfaces as described above, which may be formed from a hard low friction material such as PTFE or a hard plastic with a low friction coating on the cam surfaces. The inner parts may be attached to an inner face of the outer part by co-moulding or other means. Gaps between adjacent inner parts may allow the toothed belt to bend around tight corners in an eye shape such, for example, as in the nose region.

Suitably, the inner parts may further have a lip portion that is arranged to overlap partially with the outer surface of the hard member.

As described above, the lens assembly of the invention or a product incorporating such a lens assembly may include suitable control electronics for operating a suitable drive mechanism for actuating the actuating tabs. The control electronics may suitably include one or more sensors including, for example, pressure sensors, temperature sensors, actuator position sensors, limit switches and curvature sensors to provide feedback control for adjusting the pressure of the fluid in the envelope and the actuating tabs to the correct focusing power of the membrane.

In one aspect, therefore, the invention provides a mechanism for applying active control at multiple points that are spaced around the eye-shape, both to improve the optics of existing designs and to give the designer more freedom as to where to site the optical centre, which may allow a greater range of eye-shapes to be made, and/or the lens thickness to be minimised.

In accordance with a fourth aspect of the present invention, there is provided eyewear comprising one or more variable focusing power liquid lens assemblies according to the first, second and/or third aspects of the invention.

In accordance with a fifth aspect of the present invention, there is provided an AR/VR headset comprising one or more variable focusing power liquid lens assemblies according to the first, second and/or third aspects of the invention. The AR/VR headset may comprise at least one pair of variable focusing power liquid lens assemblies in alignment with each other on an optical axis with a transparent display interposed therebetween. It will be understood that the variable focusing power liquid lens assemblies should be arranged such that in use the user will look straight ahead through the variable focusing power liquid lens assemblies along the optical axis.

In accordance with a sixth aspect of the present invention, there is provided pair of glasses or other eyewear product such as a virtual or augmented reality headset that comprises two or more variable focusing power liquid lens assemblies according to the first, second and/or the third aspects of the invention that are arranged to be positioned in front of a user's eyes; further comprising a single actuator for operating the actuating tabs in the two or more lens assemblies.

Following is a description by way of example only with reference to the accompanying drawings of embodiments of the present invention.

BRIEF DESCRIPTION OF THE DRAWINGS

In the drawings:

FIG. 2 is a front view of a membrane support ring of an adjustable ophthalmic lens with three active control points A at a temple side of the support ring and static control points S spaced around the support ring where it intersects a theoretical volume-conserving neutral circle on a membrane held around its peripheral edge by the support ring.

FIG. 17 is a front view of another variable focusing power fluid-filled lens assembly according to a second embodiment of the present invention in which nine active control points and a single static control point are spaced around a membrane support ring for controlling the shape of a distensible membrane that is held around a peripheral edge by the support ring according to the state of actuation of the assembly. Two forwardly extending pins are provided two prevent azimuthal rotation of the membrane support ring.

FIG. 18 is a bottom view of the variable focusing power fluid-filled lens assembly of the second embodiment.

FIG. 19 is a cross-sectional view of the variable focusing power fluid-filled lens assembly of the second embodiment through line A-A shown in FIG. 17 which shows a fluid filled envelope which is bounded to the front by the distensible membrane and to the rear by a flexible wall supported on a front surface of a hard lens. A tension member extends circumferentially around the assembly in a groove formed in a side surface of the hard lens and one of the pins is shown extending forwardly from the hard lens through a hole in the support ring to permit movement of the support ring towards and away from the hard lens while preventing azimuthal rotation of the support ring.

DETAILED DESCRIPTION OF THE INVENTION

Example 1

Figure 3:
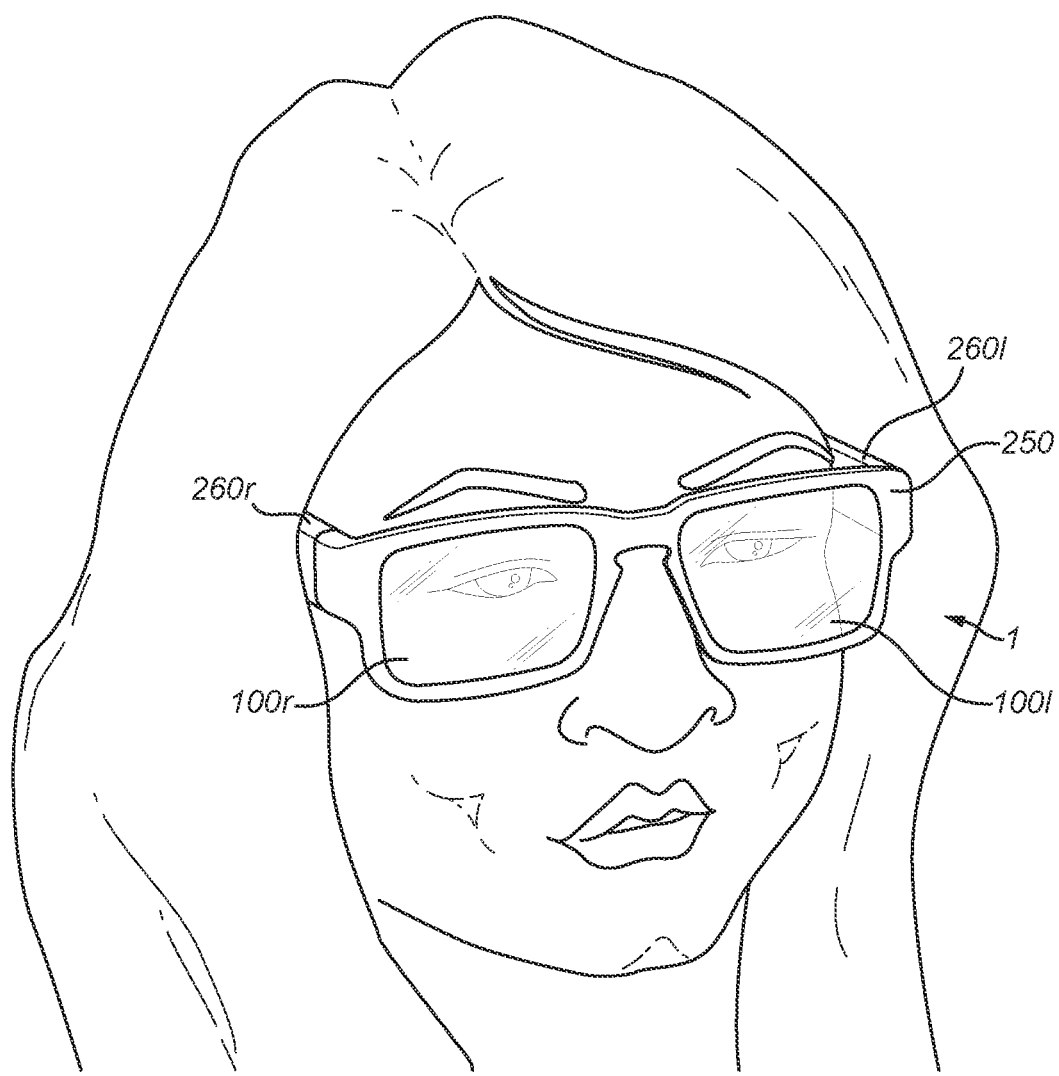
FIG. 3 illustrates an article of eyewear worn by a user which incorporates one or more variable focusing power fluid-filled lens assemblies in accordance with the invention.

FIG. 3 shows a pair of eyeglasses 1 with right and left adjustable lens assemblies 100r, 100l that incorporate a first embodiment of the invention. Lens assemblies 100r, 100l are housed in frame front 250, and right and left temple arms 260r, 260l are provided. In embodiments of the invention, the temple arms 260r, 260l and frame front 250 may contain one or more of control electronics, battery or other power sources, eye-tracking devices, communication devices such as a Bluetooth aerial, user input devices such as touch switches, actuators and associated mechanisms such as linkages, gears, belt drives, cams and so on, as described below.

The terms "right" and "left" as used herein refer to the anatomical right and left sides, respectively, of the user of the eyeglasses as shown in FIG. 3. The terms "front", "forwardly" and the like and "rear" (or "back"), "rearwardly" and the like refer to locations that are respectively further away from, or closer to, the user's face. "Top" and "bottom" relate to the usual upright orientation of the user. Parts of the eyeglasses that are closer to the user's nose are referred to herein as being a "nose" or "nasal" part or the like, while parts that are closer to one of the user's temples are a "temple" part or the like.

As can be seen from FIG. 3, the left- and right-hand lens assemblies 100r, 100l of the present embodiment are non-round. They have the same shape as each other, but are mirror images of one another about the user's sagittal plane, which extends through a nose-bridge forming part of the frame front 250 between left and right eye-wires. Each of the lens assemblies 100l, 100r extends transversely from a respective nose-side of the frame front 250, adjacent the nose-bridge of the eyeglasses 1, which rests on the user's nose when the eyeglasses 1 are worn, to a temple side of the frame front 250, where the frame front 250 joins with respective temple arms 260r, 260l.

The construction of the left-hand lens assembly 100l is shown in more detail in FIGS. 4A to 8B, but it will be understood that the following description applies equally to the right-hand lens assembly 100r. In the subsequent description of the lens assemblies 100r, 100l therefore the side-identifiers "l" and "r" are omitted.

Figure 7:
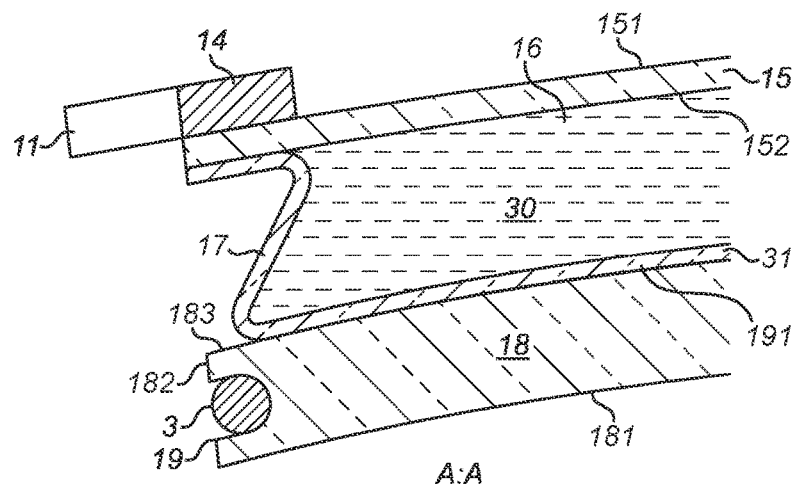
FIG. 7 is a cross-sectional view of the variable focusing power fluid-filled lens assembly of the first embodiment through line A-A shown in FIG. 4A which shows a fluid filled envelope which is bounded to the front by the distensible membrane and to the rear by a flexible wall supported on a front surface of a hard lens. A tension member extends circumferentially around the assembly in a groove formed in a side surface of the hard lens.

As best shown in FIG. 7, the lens assembly 100 comprises a non-round hard lens 18 which is formed from a hard, optically clear material of the kind that is commonly used for making ophthalmic lenses. The hard lens 18 has a front surface 183, a rear surface 181, and an outer peripheral side surface 182. The hard lens 18 may have any suitable shape and may be a converging lens, a diverging lens, or it may have substantially no optical power of its own. The hard lens 18 may be a prescription lens for correcting a refractory error in the user's vision. As illustrated in FIG. 7, the hard lens 18 may suitably be a meniscus lens with a convex front surface 183 and a concave rear surface 181.

The lens assembly 100 also comprises a distensible membrane 15 having a non-round shape that corresponds to the shape of the hard lens 18 that is positioned in front of and spaced apart from the hard lens 18 on the z-axis of the assembly, as described above. The membrane 15 is suitably formed from a sheet of a thermoplastic polyurethane (e.g. Elastollan® 1185A10, which is commercially available from Messrs. BASF) and has a thickness of about 220 μm. Other suitable materials that may be used for the membrane 15, as well as the other components of the lens assembly 100, are disclosed by WO 2017/055787 A2, the contents of which are incorporated herein by reference. The membrane 15 is also optically clear, being transparent to light across at least a part or parts of the visible spectrum. The membrane 15 and hard lens 18 suitably have the same or similar refractive indexes.

The membrane 15 is held under tension around its periphery by a resiliently bendable supporting ring 14 which serves as a membrane holding structure. In the present embodiment, the supporting ring 14 is fabricated from a sheet of stainless steel and has a thickness of about 0.55 mm, but more generally the ring may have a thickness in the range about 0.50-0.60 mm, or the supporting ring may comprise a stack of two or more ring elements instead of a single ring. The front surface 151 of the membrane 15 is bonded to the supporting ring 14 with a light curable adhesive (e.g. Delo® MF643 UV curing epoxy adhesive) or other means and is held at a line tension of about 200 $Nm^{-1}$ to maintain the optical quality of the front surface 151 of the membrane 15.

The membrane 15 and ring 14 are joined to the hard lens 18 by a dish-shaped part 31 having a rear surface 191 and collapsible side wall 17. The rear surface 191 of the dish-shaped part 31 is substantially the same shape as the front surface 183 of the hard lens 18 and is bonded the front surface 183 of the hard lens 18. The side wall 17 is bonded to the rear surface 152 of the membrane 15. It will be appreciated that while in the present embodiment, the membrane 15 is located in front of the hard lens 18, in other embodiments, the hard lens 18 may be positioned in front of the membrane 15, as described for example in international patent application no. PCT/GB2019/050106, the contents of which are incorporated herein by reference.

Figure 8A:
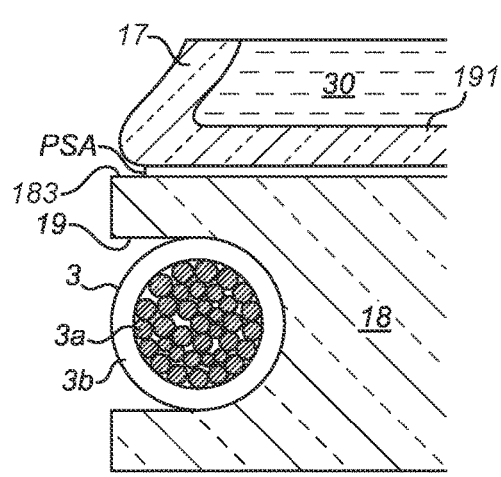
FIGS. 8A and 8B illustrate details of the tension member and the groove in accordance with two alternative embodiments of the invention.
Figure 8B:
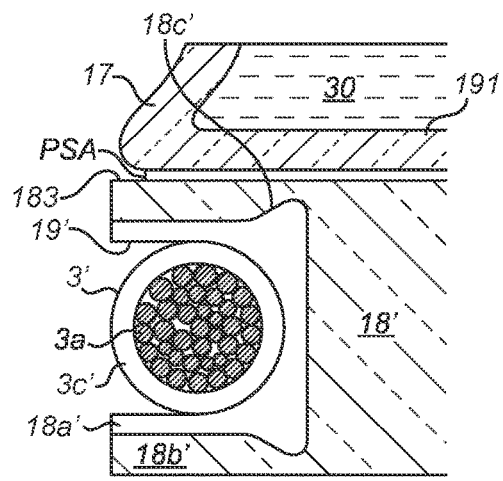

The rear surface 191 of the dish-shaped part 31 is bonded to the front surface 183 of the hard lens 18 using an optical pressure sensitive adhesive (PSA), as indicated in FIGS. 8A and 8B. Bonding of dish-shaped part 31 to the membrane 15 and hard lens 18 can also be achieved using a suitable adhesive (e.g. Delo® MF643 UV curing epoxy adhesive) or other means such, for example, as ultrasonic welding, laser welding and the like. The dish-shaped part 31 and membrane 15 thereby form a sealed cavity 30.

The cavity 30 of the envelope is filled with a sensibly incompressible, optically clear, refractive fluid 16. The fluid 16 should be colourless and have a refractive index of at least about 1.5 to match the refractive indices of the hard lens 18 and membrane 15. Suitably the refractive index of the membrane 15 and fluid 16 should be matched as closely as possible, so that the interface between the membrane 15 and fluid 16 is substantially imperceptible to the user. The fluid 16 should have low toxicity and low volatility; it should be inert and exhibit no phase change above about −10° C. or below about 100° C. The fluid 16 should be stable at high temperatures of at least about 80° C. and exhibit low microbial growth. In some embodiments, the fluid 16 may have a density of about 1 $g/cm^3$. Various suitable fluids are available to those skilled in the art, including silicone oils and siloxanes such, for example, as phenylated siloxanes. A preferred fluid is pentaphenyltrimethyltrisiloxane.

The membrane 15 thus forms a front optical surface 151 for the lens assembly 100, with the optical power of the fluid-filled lens assembly 100 being determined by the curvature of the front surface 151 of the membrane 15 and the rear surface 181 of the hard lens 18 because the refractive indices of the membrane 11, the fluid 16, and hard lens 18 are substantially the same.

When the lens assemblies 100 are mounted in the frame front 250, the supporting ring 14 is able to move within the frame front 250 towards and away from the hard lens 18 along the z-axis, as will be described in more detail below, with the side wall 17 folding on itself or extending respectively to allow such movement.

In other embodiments of the invention, more than one supporting ring 14 may be used. For example, the membrane 15 may be sandwiched between two similar supporting rings as described, for example, in WO 2013/144533 A1, the contents of which are herein incorporated by reference. In the present embodiment, only one ring is described for simplicity.

The overall optical power of the lens assembly 100 is determined by the curvature of the front surface the membrane 151 and the rear surface 181 of the hard lens 18. As the rear surface 181 of the hard lens 18 is fixed, the optical power of the lens assembly 100 is therefore controlled by causing the distensible membrane 15 to distend outwardly or to retract inwardly by adjusting the pressure of the fluid 16 within the envelope 30. In the present embodiment, the pressure and disposition of the fluid 16 within the envelope 30 is adjusted by controlling the profile of the boundary of the membrane 15 by displacing one or more circumferential regions of the supporting ring 14 towards or away from the hard lens 18; particularly the curvature of the supporting ring 14 in a plane defined by the z-axis and a tangent to the boundary of the membrane 15.

Figure 4A:
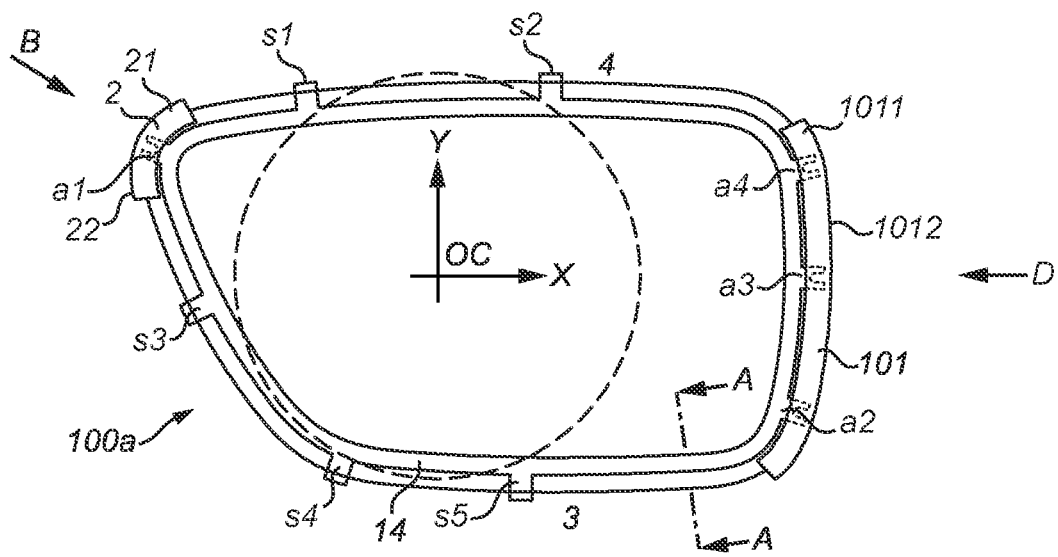
FIG. 4A is a front view of a variable focusing power fluid-filled lens assembly according to a first embodiment of the present invention which is shown in a first actuation state.
Figure 4B:
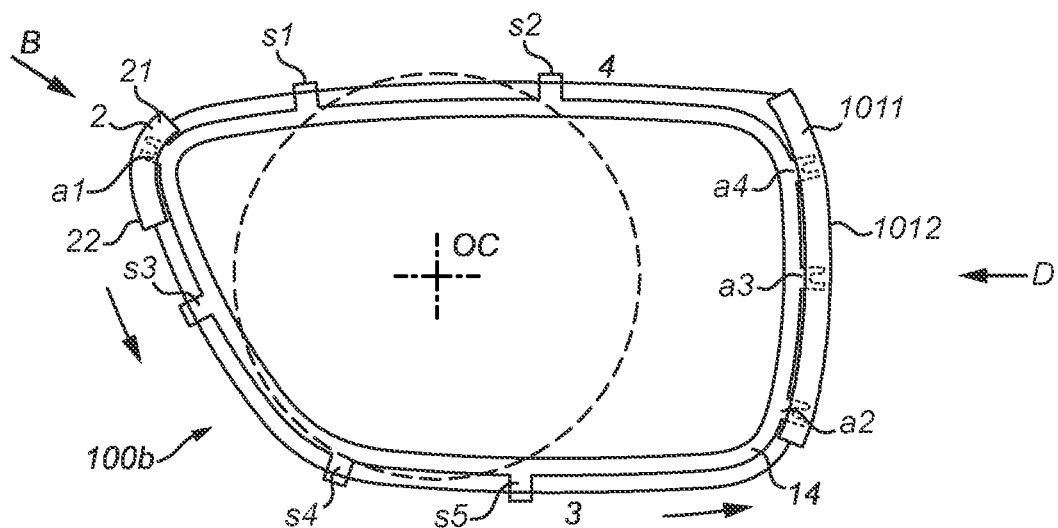
FIG. 4B is a front view of the variable focusing power fluid-filled lens assembly of FIG. 4A which is shown in a second actuation state, a distensible membrane of the lens assembly being more distended in the second state than in the first state.

As best seen in FIGS. 4A and 4B, the supporting ring 14 is formed with a plurality of peripherally spaced, outwardly protruding integral tabs for enabling the position of the ring 14 along the z-direction to be controlled at those locations. In the present embodiment, there are five static control tabs s1 to s5, which are constrained in the z-direction at a fixed distance from the front surface 183 of the hard lens 18. Static control tabs s1 and s2 are spaced apart on a top of the supporting ring 14; static control tab s3 is positioned on a nose-side of the supporting ring 14; and static control tabs s4 and s5 are spaced apart on a bottom of the supporting ring 14. Static control tabs s1-s5 are positioned around the supporting ring 14 close to where a neutral circle, as defined above, meets the edge of the membrane, and it will be understood that in some embodiments more or fewer than five static control tabs may be provided as required; for example as disclosed by WO 2013/144592 A1. Means for constraining the static control tabs s1 to s5 in the z-direction are provided but are omitted from the drawings for clarity. The shape of the membrane 15 is actively controlled by displacing three active control tabs a1, a2, a3 that are positioned around the supporting ring 14 towards or away from the hard lens 18 along the z-axis. Active control tab a1 is located in a nasal region of the supporting ring 14, whereas active control tabs a2 to a4 are located along a temple-side of the supporting ring 14, opposite the nose side. Again, in some embodiments, there may be more or fewer than three active control tabs as described herein.

The active control tabs are moved in the z-direction by a system of reciprocating cams, as described in detail below. A nasal cam plate 2 is positioned juxtaposed the nasal region of the lens assembly 100 for moving the active control tab a1 in that region. The nasal cam plate 2 comprises an arcuate body that is shaped to conform to the lens assembly 100 in the nasal region, as best seen in FIGS. 4A and 4B, and a U-shaped cross-section comprising opposing front and rear arms 21 that are spaced apart by a side-wall 22, as best seen in FIGS. 4A to 6B. A slot in the form of an escalator 108 is formed in the side-wall 22, the slot being shaped and configured to receive and actuate active control tab a1. As can be seen in FIGS. 4A to 5B, the hard lens 18, fluid filled dish-shaped part 31, membrane 15, and supporting ring 14 are interposed between the arms 21 of the nasal cam plate 2. The nasal cam plate 2 thus sits slidably on those parts in the nasal region, with the active control tab a1 being received in the escalator 108.

Figure 5A:
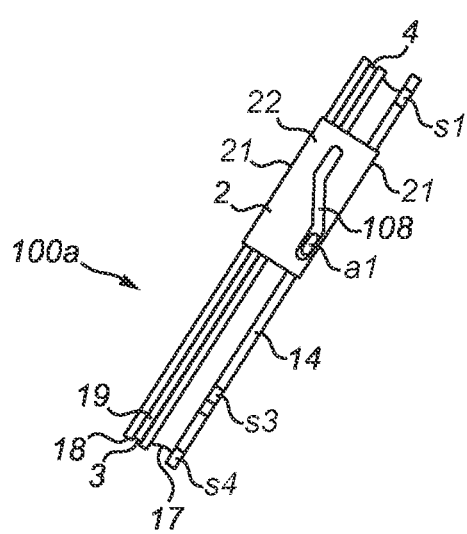
FIGS. 5A and 5B are side views from a nose side of the variable focusing power fluid-filled lens assembly of the first embodiment in the first and second actuation states respectively.
Figure 5B:
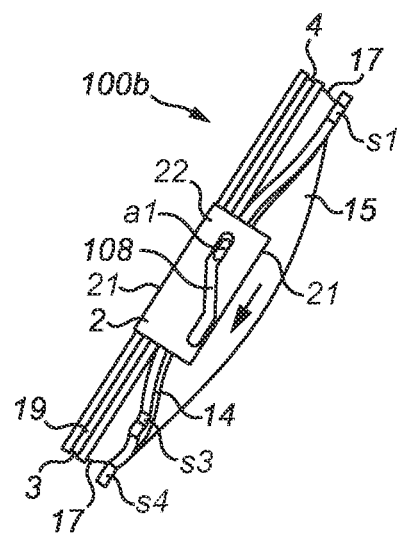
Figure 6A:
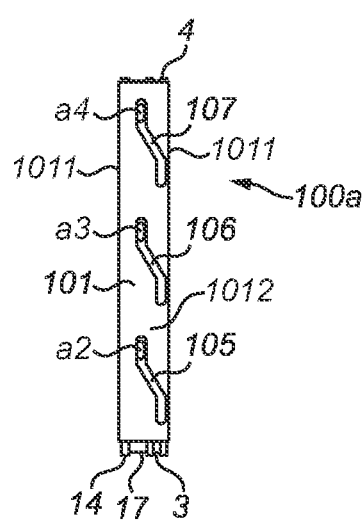
FIGS. 6A and 6B are side views from an opposite temple side of the variable focusing power fluid-filled lens assembly of the first embodiment in the first and second actuation states respectively.
Figure 6B:
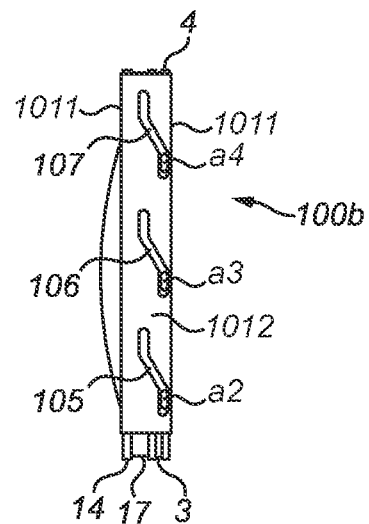

Similarly, a temple cam plate 101 is juxtaposed the temple-side of the lens assembly 100 for moving the active control tabs a2, a3, a4 that are spaced along the temple-side of the supporting ring 14 along the z-axis, as best seen in FIGS. 4A and 6B, and FIGS. 6A and 6B. The temple cam plate 101 comprises an arcuate body that is shaped to conform to the lens assembly 100 at the temple-side of the lens assembly 100 and a U-shaped cross-section comprising opposing front and rear arms 1011 and a side-wall 1012. The temple cam plate 101 comprises three spaced-apart escalators 105, 106, 107 formed in the side-wall 1012, each of which is shaped and configured to receive and actuate a respective one of the active control tabs a2, a3, a4. As can be seen in FIGS. 5A and 5B, the hard lens 18, fluid filled dish-shaped part 31, membrane 15, and supporting ring 14 are interposed between the arms 1011 of the temple cam plate 101. The temple cam plate 101 thus sits slidably on those parts at the temple-side of the lens assembly 100 with the active control tabs a2, a3, a4 being received in the respective escalators 105, 106, 107. Means for translating the nasal and temple cam plates 2, 101 in the x, y plane are provided, as described in more detail below.

Figures 1A, 1B:
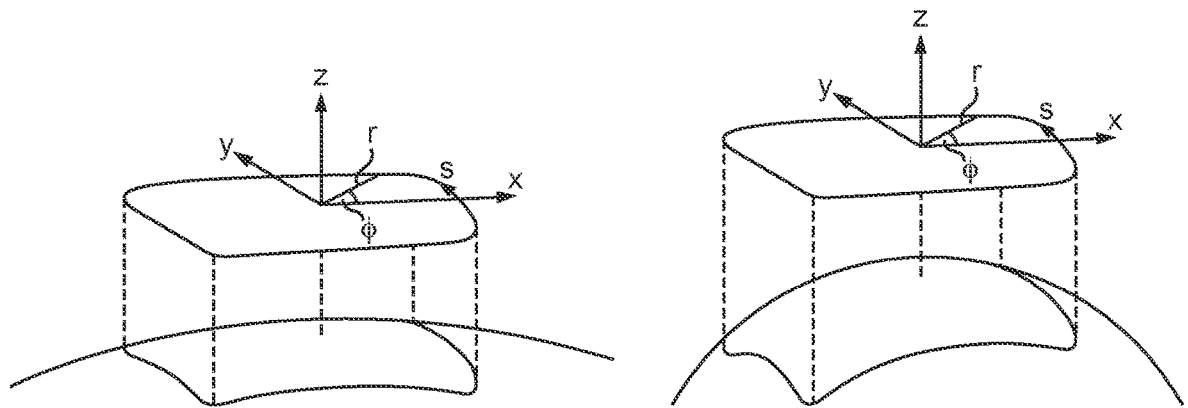
FIGS. 1A and 1B illustrate schematically how a non-circular boundary of a membrane of a variable focusing power fluid-filled lens assembly having a spherical optical surface of variable curvature must form a projection of itself onto multiple spheres for good optical quality.
Figure 2:
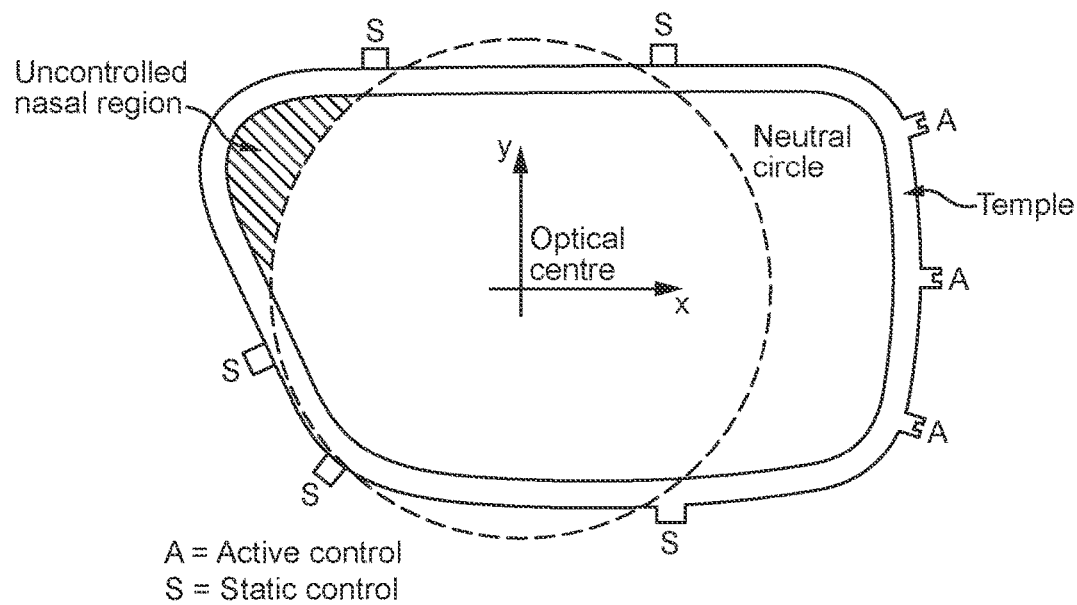
FIG. 2 shows part of a known liquid lens assembly of the kind disclosed by WO 2013/144592 A1. In particular.

The nasal and temple cam plates 2, 101 are connected by tension members 3 and 4 that are located and extend between the nasal and temple cam plates 2, 101 in a groove 19 formed in the outer peripheral side surface 182 of the hard lens 18. An upper tension member 4 passes around the top of the hard lens 18 and interconnects upper ends of the respective cam plates 2, 101 and a lower tension member 3 passes around the bottom of the hard lens 18 and interconnects the lower ends of the cam plates 2, 101. The purpose of the tension members 3, 4 is to couple the nasal and temple cam plates 2, 101 together so that movement of one is transferred to the other. For example, FIG. 4B corresponds to FIG. 4A, but the temple cam plate 101 has been moved upwards (along the y-axis) by an actuator located at the temple side of the lens assembly 100 (omitted for clarity). As can be seen, this upward movement of the temple cam plate 101 has caused the nasal cam plate 2 to move downwardly. Owing to the shapes of the cam plates 2, 101 that are matched to the juxtaposed regions of the supporting ring 14 and side wall 182 of the hard lens 18, the cam plates 2, 101 can also be regarded as reciprocating azimuthally juxtaposed the boundary of the membrane in the s-direction; the s-direction being indicated in FIGS. 1A and 1B.

The configuration of the escalators 105, 106, 107, 108 within the respective cam plates 101, 2 is such that as the temple cam plate 101 moves upwardly and the nasal cam plate 2 moves downwardly, or vice versa, active control tabs a1, a2, a3, a4 cammingly engage with their respective escalators 108, 105, 106, 107 to move the active control tabs a1, a2, a3, a4 with bidirectional active control. As the cam plates 2, 101 are moved in the s-direction, the escalators 105, 106, 107, 108 are each arranged to engage front and rear surfaces of each of the respective active control tabs a1, a2, a3, a4 to actively move each of the respective tabs a1, a2, a3, a4 backwards or forwards along the z-axis, closer to or further away from the hard lens 18 and thereby increase or reduce the curvature of the membrane 15, as can be seen from a comparison of FIGS. 4A and B, 5A and B, and 6A and B. It will be understood that the escalators 105, 106, 107, 108 may be individually configured according to the desired locus of displacement of the corresponding active control tab a1, a2, a3, a4. Thus, two or more of the escalators 105, 106, 107, 108 may have the same configuration as each other; while two or more of the escalators 105, 106, 107, 108 may have a different configuration from each other.

Tension members 3, 4 are relatively tightly connected between the cam plates 2, 101 such that they do not exhibit any slack. The tension members 3, 4 need to have a relatively high elastic stiffness so that they do not exhibit significant strain in use, be small enough in cross-section to fit within the size constraints of the lens assembly 100, and be flexible and slidable in the groove 19. In the present embodiment, the tension members 3,4 are suitably formed from a wire comprising a braided steel core 3a surrounded by a low friction sheath 3b, as best shown in FIG. 8A. A potentially critical design parameter in this case is possible stiction between the sheath 3b and groove 19. Sheath 3b can suitably be made of PTFE, or some other polymer having a low coefficient of friction, while hard lens 18 is made of some suitable optical lens material polymer, glass, sapphire, and so forth as mentioned above. Other suitable materials for the hard lens 18 and sheath 3b will be apparent to a person skilled in the art.

An alternative groove and tension member arrangement is shown in FIG. 8B. In this case the hard lens 18' comprises a substantially U-shaped channel 18b' around its outer peripheral side 182' into which a complementarily-shaped low friction insert 18a' is installed. A groove 19' is formed in the low friction insert 18a' which takes the place of the groove 19 as already described with reference to FIG. 8B. As can be seen, insert 18a' has a "fishtail" feature 18c' which mechanically interlocks with the channel 18b' in the hard lens 18' to retain the insert 18a' within the channel of the hard lens 18'. Because the groove 19' is now formed by a material having a low coefficient of friction, the tension member 3' does not itself necessarily require a low-friction sheath 3c'. The material for sheath 3c' may therefore be chosen for its toughness and flexibility, while material for insert 18a' may be chosen for its tribology with the sheath 3c'.

Figure 10:
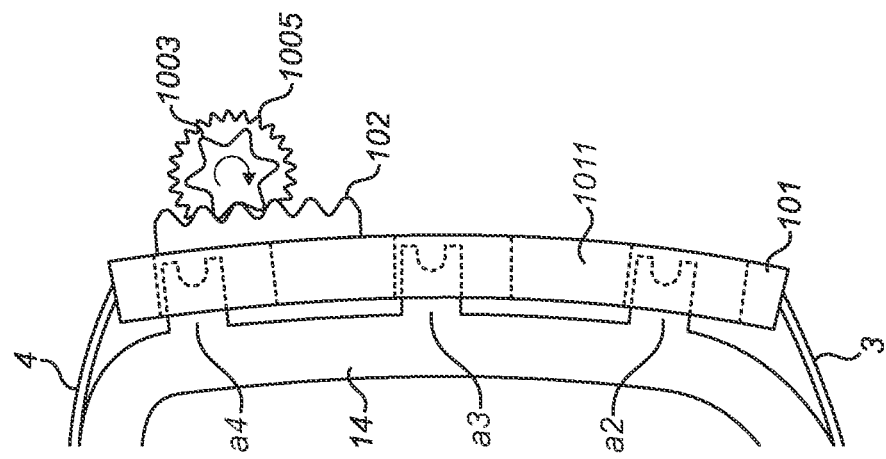
FIG. 10 is a front view of the actuation mechanism of FIG. 9 which shows part of a membrane support ring that holds the distensible membrane around its peripheral edge and has three tabs formed on its temple side that serve as cam members cooperating with corresponding cam tracks formed in the cam plate for actuating the lens assembly.
Figure 9:
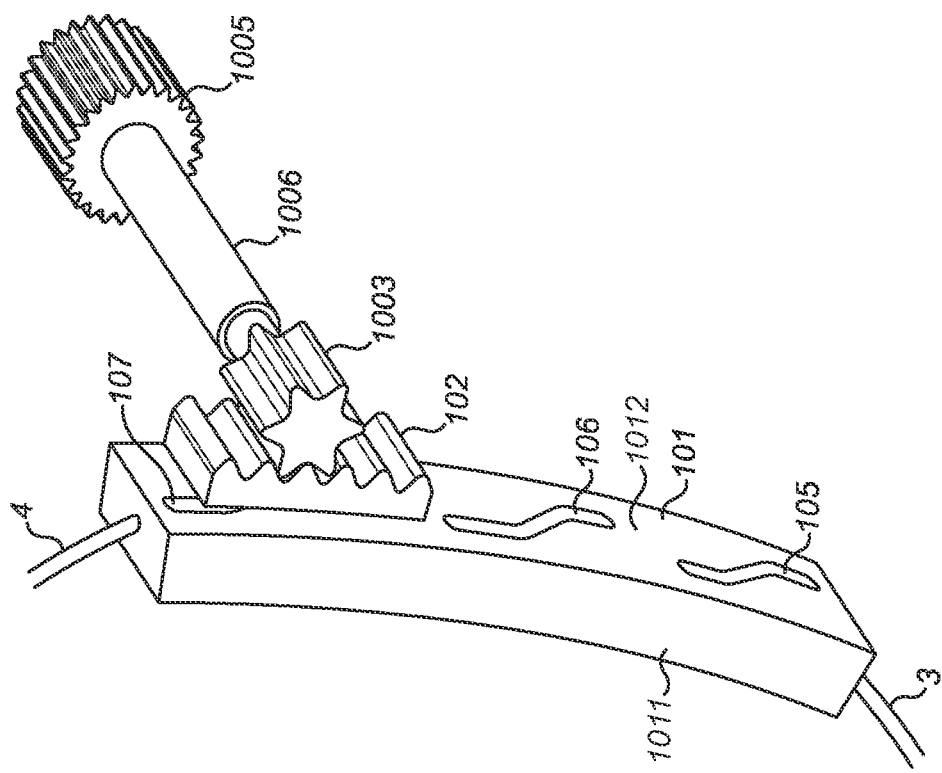
FIG. 9 is a perspective view from above and to the front of the temple side of part of the variable focusing power fluid-filled lens assembly of the first embodiment which includes an actuation mechanism comprising a rack mounted on a cam plate and a cooperating pinion connected to a user-operable thumb-wheel.

FIGS. 9 and 10 show an example of how the cam plates 2, 101 can be configured to be mechanically driven from the temple-side of the lens assembly 100 where there may be more space within the frame 250, 2601 to accommodate an actuator arrangement as described below. The temple cam plate 101 comprises a rack 102 that runs along an outer surface of the side-wall 1012 of the cam plate 101. The rack 102 serves as a coupling for connecting the rack drivably to an actuating device as described below. The rack 102 may be integrally formed with the cam plate 101 or it may be a separate component that is bonded or welded to it during the manufacturing process. The rack 102 is driven by a pinion 1003 that is mounted within the temple-side of the frame front 250 and serves as a cooperating coupling for the rack 102. Pinion 1003 is connected to a thumbwheel 1005 by a shaft 1006 that projects rearwardly from the pinion, 1003, so that the thumbwheel can be integrated into the temple arms 260 of the eyeglasses 1. With this arrangement, the power of the lens assembly can be manually adjusted by the user by turning the thumbwheel 1005 to move the cam plates 2, 101 up or down, as described above, to actuate the lens. This configuration requires a separate actuator arrangement i.e. rack 102, pinion 103, and thumbwheel 1005 for each eye.

Figure 11:
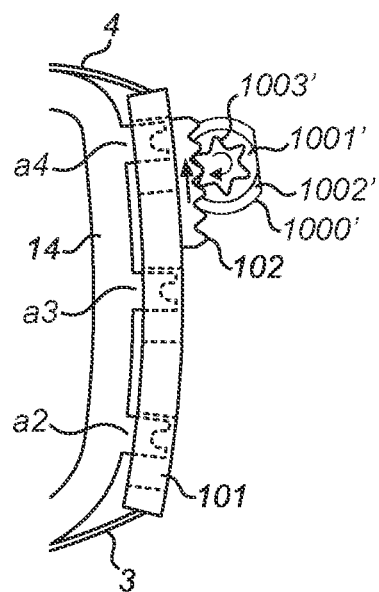
FIG. 11 is a front view of an alternative actuation mechanism for the variable focusing power fluid-filled lens assembly of the first embodiment which is arranged to be driven by an electric motor instead of a thumb-wheel.

Alternatively, a rack and pinion arrangement can be configured to be electronically driven by means of a motor assembly 1000' as shown in FIG. 11. The motor assembly 1000', which is shown in more detail in FIG. 8B comprises a gear 1003', which replaces the pinion 1003 as the coupling to the rack 102, a gearbox 1001', an electric motor 1002', and an optional position encoder 1004'. Alternatively, one or more of: position sensors, rotation sensors, limit switches or extension sensors may be provided on one or more of the cams, gears or other actuator components to sense the actuation state of the lens assembly 100.

FIGS. 13A to 13D show four different embodiments of arrangements for mechanically actuating the nasal cam plates 2 in which only a single actuator is needed to actuate simultaneously the cam plates 2, 101 of both the left and right lens assemblies 100l, 100r. In FIGS. 13A to 13D both the left- and right-hand lens assemblies are shown. However, as the lens assemblies are mirror images of one another, the side-identifiers "l" and "r" are again omitted in the following where features that are common to both the left and right lens assemblies 100l, 100r are described. FIGS. 13A to 13D all show embodiments in which the nasal cam plate 2 comprises a rack 2002 that runs along the outer surface of the side-wall 22 of the cam plate 2. The rack 2002 may be integrally formed with the cam plate 2 or it may be a separate component that is bonded or welded to it during the manufacturing process.

Figure 13A:
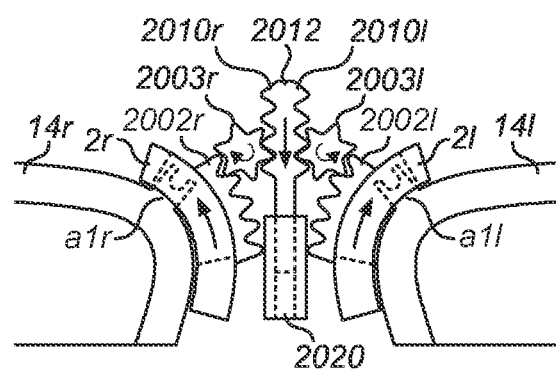
FIGS. 13A-D illustrate different single actuation mechanisms that are adapted to operate two variable focusing power fluid-filled lens assemblies simultaneously.
Figure 13B:
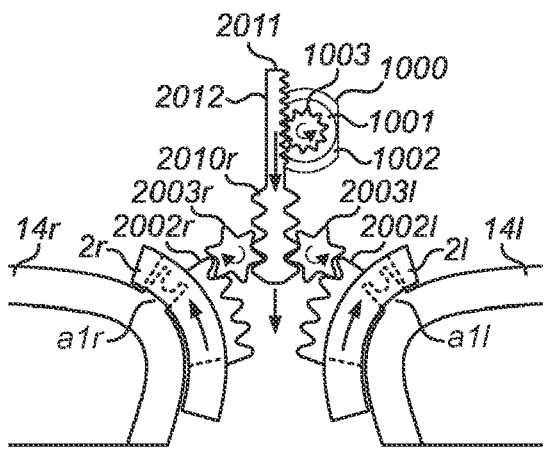

FIG. 13A shows an embodiment in which the racks 2002l, 2002r of the lens assemblies 100l, 100r are both driven by pinions 2003l, 2003r in a manner similar to that described above with reference to FIGS. 9 and 10. However, an elongate member 2012 having a first rack 2010l on its left-hand side and a second rack 2010r on its opposite right-hand side is interposed between the pinions 2003l, 2003r and engages with the pinions 2003l, 2003r such that driving the elongate member 2012 upwardly or downwardly rotates the pinions 2003l, 2003r which in turn drives the nasal cam plates 102l, 102r upwardly or downwardly. As best seen in FIG. 13A, driving the elongate member 2012 downwardly moves the nasal cam plates 102l, 102r upwardly. In this embodiment, the elongate member 2012 is driven by a linear actuator 2020, such as a solenoid or piezo-squiggle motor, positioned in the nose-bridge of the frame front 250, below the elongate member 2012. In an alternative embodiment, the elongate member 2012' comprises a further rack 2011' positioned on a projecting portion that projects upwardly, above the racks 2010l, 2010r, as can be seen in FIG. 13B. In this embodiment, the gear 1003' of a motor assembly 1000' engages with the further rack 2011' so that the elongate member 2012', and therefore the nasal cam plates 2l, 2r, can be oscillated by rotation of the gear 1003' of the motor assembly 1000'.

Figure 13C:
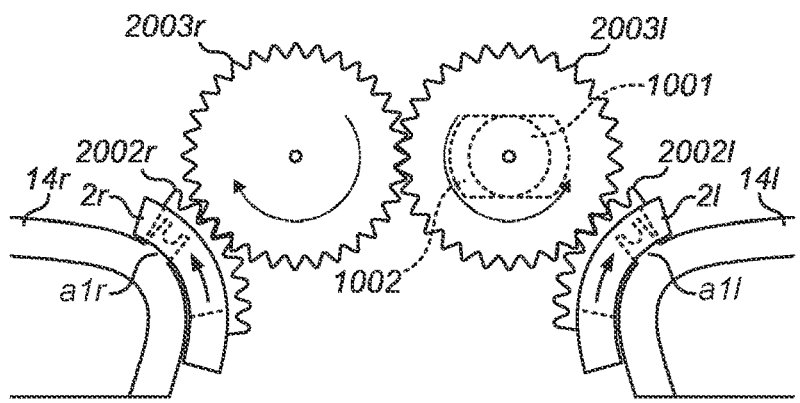

In the embodiment shown in FIG. 13C, left and right pinions 2003l, 2003r engage with the left and right nasal racks 2002l, 2002r to actuate the respective nasal cam plates 2l, 2r. However, in this case the pinions 2003l, 2003r are sized such that they engage with each other at the centre of the nose-piece of the eyeglasses such that rotation of either one of the pinions causes rotation of the other. In this embodiment the pinions 2003l, 2003r, and thereby the nasal cam plates 2l, 2r, are actuated by a motor assembly connected to the left pinion 2003l to rotate the left pinion 2003l.

Figure 12:
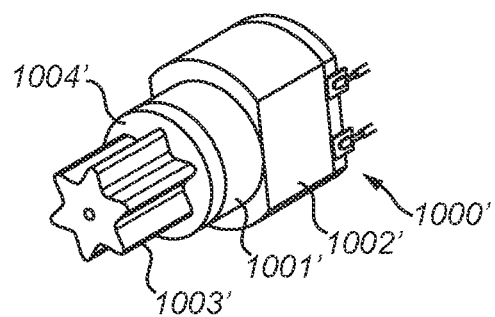
FIG. 12 is a perspective view of the electric motor shown in FIG. 11 which is connected to a pinion through a gearbox and a position encoder.
Figure 13D:
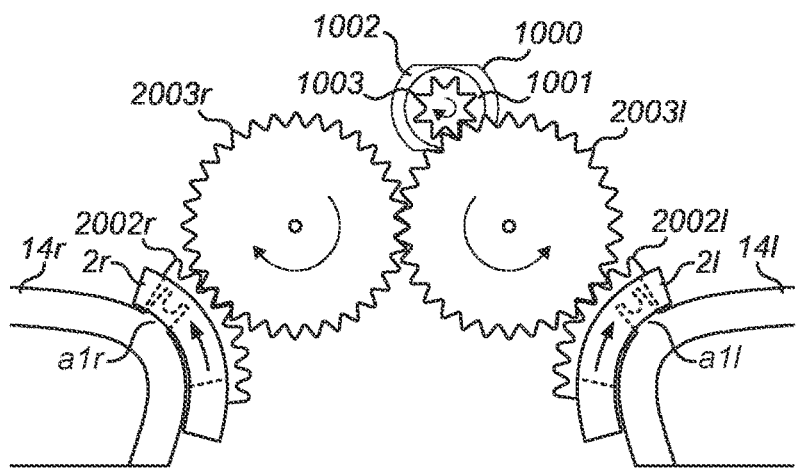

The embodiment shown in FIG. 13D is similar to that in FIG. 13C. However, in this case the pinions 2003*l*, 2003*r*, and thereby the nasal cam plates 2*l*, 2*r*, are instead actuated by a motor assembly 1000' of the kind shown in FIG. 12. The gear 1003' of the motor assembly 1000' engages with the left pinion 2003*l* to rotate the left pinion 2003*l*.

Figure 14:
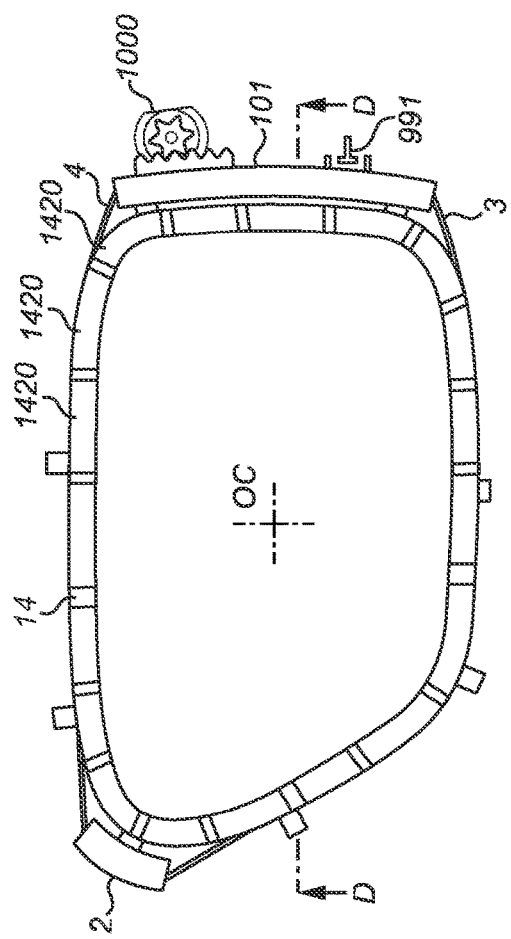
FIG. 14 illustrates schematically an electronic control system for the variable focusing power fluid-filled lens assembly of the first embodiment including the actuation mechanism of FIG. 11.
Figure 15:
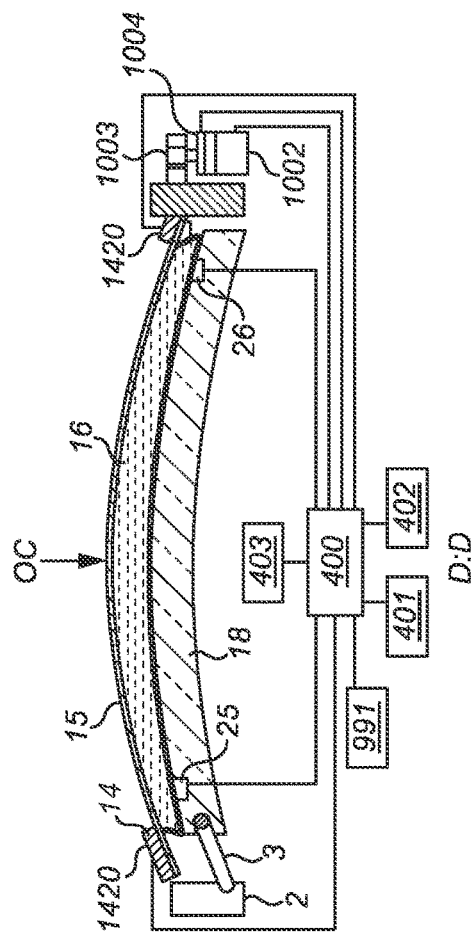
FIG. 15 is a front view of the variable focusing power fluid-filled lens assembly of the first embodiment which includes various sensors on the support ring, cam plate and electric motor forming part of the control system of FIG. 14.

FIGS. 14 and 15 show an example of a lens assembly 100 in accordance with the invention that comprises an electronic control system with various sensors for determining the location of the supporting ring 14. The lens assembly 100 is provided with control electronics 400 for controlling the actuation of the lens assembly 100, power supply 403 and one or both of user input 401 and eye-tracking system 402; for instance one that utilises vergence as described, for example, in WO 2014/199180 A1, the contents of which are incorporated herein by reference. User input 401 may be via an interface on the eyeglasses 1. Alternatively, the control system may further comprise a wireless communication device, for example a mobile phone or tablet, and the user input 401 may be provided wirelessly via an app installed on the mobile phone or tablet.

The sensors include a pressure sensor 25 for sensing the pressure of the fluid 16, a temperature sensor 26 for sensing the temperature of the fluid 16, an actuator position sensor 1004, a limit switch 991 to ensure that the cam plates 2, 101 are not actuated beyond set limits, and/or curvature sensor(s) 1420. The last of these may be sections of piezoelectric material or other strain sensors disposed on support ring 14. Such curvature sensors are disclosed in PCT application number PCT/GB2019/050106.

Figure 16:
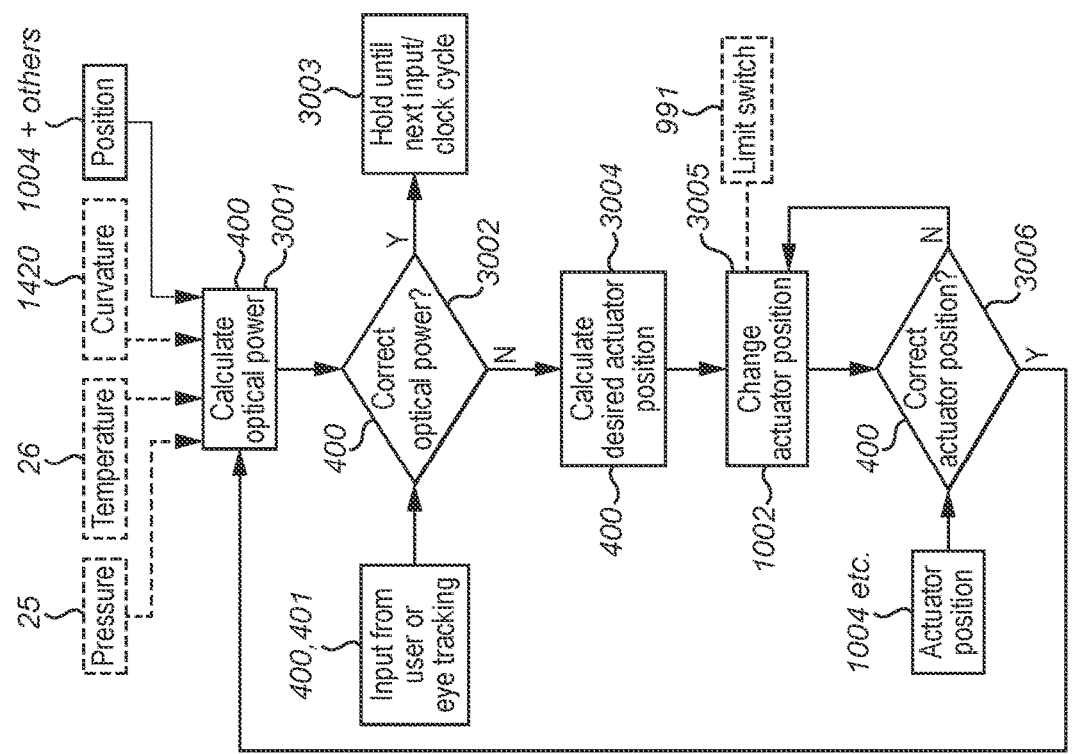
FIG. 16 is a flow diagram of a control loop for the control system of FIGS. 14 and 15.

The flow diagram of FIG. 16 describes how the control electronics 400 operate in the present embodiment to calculate the optical power of the lens assembly 100 (or a proxy therefor) from the sensor data, receive input from the user (from a touch switch, a phone app, or other means) or from an eye-tracking system, and control the optical power of the lens assembly 100 by actuating the cam plates 2, 101 as required. The control electronics 400 may be provided in the form of a microcontroller. However, a person skilled in the art will be familiar with other possible ways in which the control electronics can be implemented.

At step 3001, the control electronics 402 calculates the optical power of the lens assembly 100 from one or more of: the pressure of the optical fluid 16 measured by the pressure sensor 25, the temperature of the optical fluid measured by the temperature sensor 26, the membrane curvature measured by the curvature sensor array 1420 and/or the position of the supporting ring 14 as determined from the actuator position sensor 1004.

At step 3002 the control electronics 400 receives from either the eye tracking system 402 or user input 401 an input signal representing a target optical power desired by the user. The target optical power is then compared with the current optical power of the lens assembly 100 as measured in step 3001. If the current optical power is equal to the target optical power, no action is taken and the optical power of the lens is held at the same value until a next input/clock cycle, as indicated in step 3003. If the current optical power is not equal to the desired optical power then the control electronics 400 calculates in step 3004 the desired position of the cam plate actuator(s) necessary to achieve the local bending/deflection of the supporting ring 14 at each active control tab a1, a2, a3, a4 required to deform the membrane 15 to the target optical power of the lens assembly 100. In step 3005 the control electronics 400 actuates the cam plate actuator(s), with the limit switches 991 ensuring that the maximum/minimum deflection limits are not exceeded. In step 3006 the actual position of the cam plate actuator(s) as measured by the position sensor 1004 is compared with the target position as calculated in step 3004 and if the lengths are not correct then step 3005 is repeated.

Example 2

FIGS. 17 to 19 show another embodiment 100' of a lens assembly comprising a high aspect ratio, near round eye-shape. In this case the cam plate and tension member concept of the embodiment of Example 1 described above is extended to comprehend nine active control tabs a1'-a9' that are circumferentially spaced around the supporting ring 14. In some embodiments, more or fewer than nine active control tabs may be provided. The high aspect ratio, near round eye-shape means that virtually all of the points on the supporting ring 14' move as the power of the lens assembly 100' changes, which would be problematic for placement of static control points.

In the lens assembly 100', the optical centre (OC) is located centrally in the x-direction and above-centre in the y-direction with a single static control point s1'. As with the embodiment of Example 1 above, the active control tabs a1'-a9' are actuated by cam plates 221-229 comprising escalators 241-249 for engaging front and rear surfaces of active control tabs a1'-a9' in which the active control tabs a1'-a9' are received. Again, the hard lens 18' comprises a circumferential groove 19' in which are slidingly located nine tension members 91, 21, 32, 43, 54, 65, 76, 87, 98 that interconnect the cam plates 221-229 around the periphery of the lens assembly 100'. A peculiarity of this embodiment over the lens assembly 100 of Example 1 is the need to prevent support ring 14' rotating in azimuth. In the lens assembly 100 of the first example, azimuthal constraint is provided by the static control points s1-s5. In the present embodiment, rotation of the lens 200 is prevented by pin-and-hole features 201-202, 203-204. As can be seen from FIG. 17, the support ring 14' is formed at its bottom with a first locating tab 201 which defines a hole and at its temple-side with a second locating tab 203 that also defines a hole. A first pin 202 is anchored in the hard lens 18', as can be best seen in FIG. 19, at a corresponding position at the bottom of the hard lens 18' so that the first pin 202 can be received within the hole of first locating tab 201, and a second pin 204 is anchored in the hard lens 18' at a corresponding position at the temple side of the hard lens 18' so that the second pin 204 can be received within the hole of second locating tab 203. The supporting ring 14' is free to slide forwards and backwards in the z-direction along pins 202 and 204, which can be made of steel, or any other suitable material, as the active control tabs a1'-a9' are actuated by the cam plates 221-229. A static tab 209 is constrained in z and x, though it may tip, tilt and roll, so that the supporting ring 14 is prevented from rotating azimuthally at three points 9, 201-202 and 203-204. It will be understood that the cam plates 221-229 in this embodiment can be configured to be actuatable by any of the arrangements described above with reference to FIGS. 9 to 13D and using a control system as described with reference to FIG. 16.

Example 3

Figure 20:
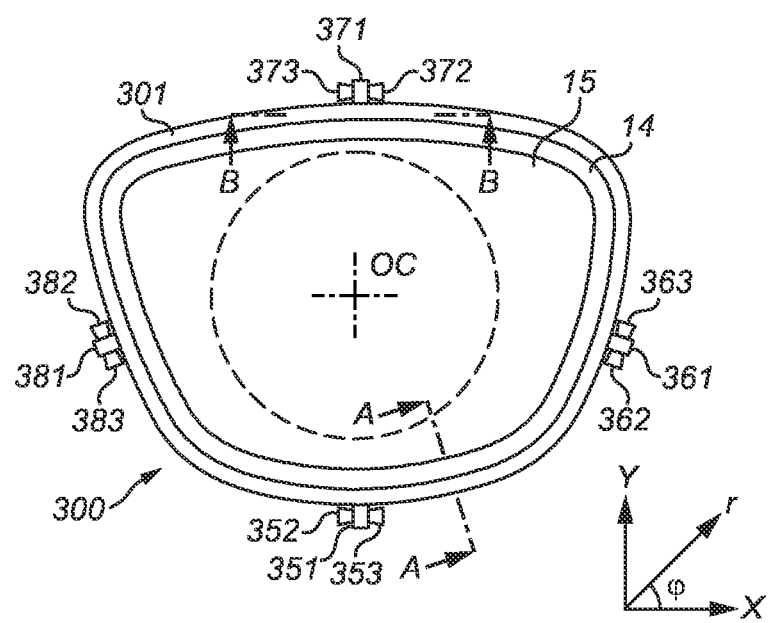
FIG. 20 is a front view of yet another variable focusing power fluid-filled lens assembly according to a third embodiment of the present invention which comprises a toothed belt that extends around the periphery of the lens assembly for actuating the assembly at multiple active control points. Pairs of posts are distributed around the periphery of the lens assembly for engagement with corresponding tab members formed on a membrane support ring to prevent azimuthal rotation of the support ring when the assembly is actuated.
Figure 21:
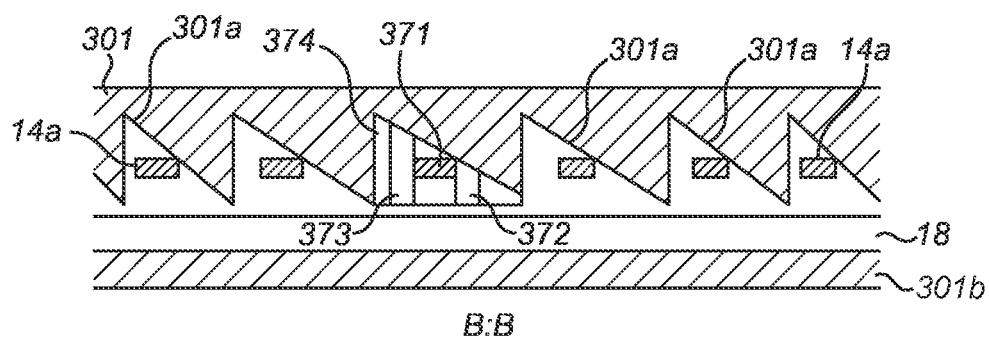
FIG. 21 is a cross-section through the toothed belt through line B-B of FIG. 20, which shows a plurality of circumferentially spaced teeth, each of which defines respective cam surface that engages a corresponding tab on the membrane support ring.
Figure 25:
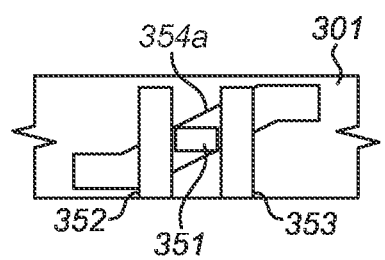
FIG. 25 is an enlarged view of one of the pairs of posts.

FIGS. 20 to 29 show a third embodiment of a lens assembly 300, which has a shape and optical centre (OC) location such that there are no suitable static points on the boundary on the supporting ring 14". The supporting ring 14" in this case comprises a multiplicity of active control tabs 14a" that are circumferentially spaced around the supporting ring 14" so that the supporting ring 14" can be almost continuously actuated around its periphery. Actuation of the supporting ring 14" is effected by a belt 301 which circumferentially surrounds an outer edge of the supporting ring 14" and which is formed with a multiplicity of sawtooth-shaped recesses 301A on an inner surface thereof, such that each of the active control tabs 14a" of the supporting ring 14" is received within a corresponding saw-tooth-shaped recess 301A of the belt 301, as best seen in FIG. 21. The supporting ring 14" is constrained from azimuthal rotation by constraining a plurality of locating tabs 351, 361, 371, 381 that project radially outwardly from the supporting ring 14" through the belt 301 at the top, bottom, nasal- and temple-sides of the lens assembly 300, as can be seen in FIG. 20. Considering tab 351 at the bottom of the lens assembly 300 as an example, a saw-tooth-shaped hole 354 that is formed through the belt 301, as shown in FIG. 25, allows the corresponding locating tab 351, which is similar to tabs 14a" but longer, to protrude through the belt 301. Locating tab 351 is positioned between spaced adjacent posts 352 and 353, which are formed integrally with or fabricated as part of the frame front 250 and may be made of steel or any other suitable material, to prevent azimuthal (φ-direction) rotation of the supporting ring 14" while allowing forward-backwards (z-direction) movement thereof.

Figure 22:
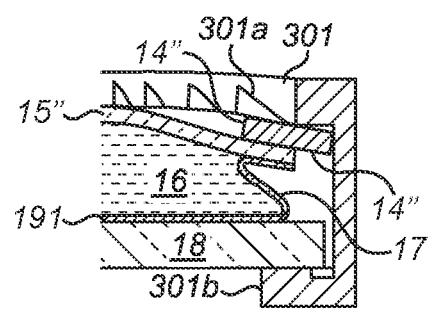
FIG. 22 is a cross-sectional view of part of the variable focusing power fluid-filled lens assembly of the third embodiment along the line A-A of FIG. 20.
Figure 23:
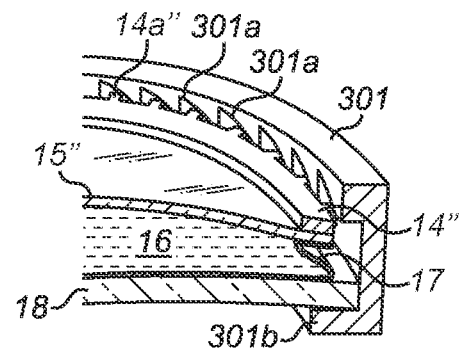
FIG. 23 is a perspective sectional view of the variable focusing power fluid-filled lens assembly of the third embodiment corresponding the FIG. 22.
Figure 24:
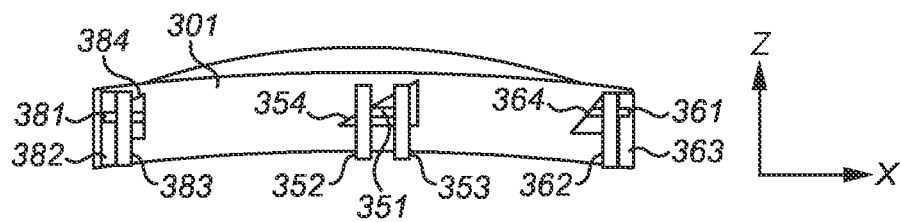
FIG. 24 is a bottom view of the variable focusing power fluid-filled lens assembly of the third embodiment which shows three of the pairs of posts engaging respective tabs on the membrane support ring to prevent azimuthal rotation of the support ring.
Figure 26:
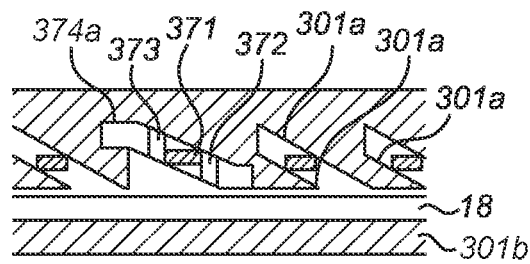
FIG. 26 shows a detail of part of the toothed belt of the variable focusing power fluid-filled lens assembly of the third embodiment which shows how some of the tabs engage a second cam surface where they must be actively displaced in both directions forwardly and rearwardly relative to the hard lens.

To increase the optical power of the lens assembly 300, the belt 301 is driven azimuthally anticlockwise in the s-direction as shown in FIG. 20, such that angled surfaces of the belt 301 that define the saw-tooth-shaped recesses 301a and saw-tooth-shaped holes 254, 364, 374, 384 cammingly engage with the active control tabs 14a, 351, 361, 371, 381 to push them towards hard lens 18. As best seen in FIGS. 22 and 23, the belt 301 comprises a lip 301b that projects inwardly of the lens assembly 300 at the rear of the lens assembly such that the hard lens 18 is constrained from moving in the z-direction by the lip 301b as the active control tabs 14a, 351, 361, 371, 381 are pushed towards hard lens 18. As the belt 301 is driven anticlockwise as shown in FIG. 20 to reduce the power of the lens, the forwards fluid pressure on the membrane 15" provides the restorative force to return the supporting ring 14" towards its undeformed state. This arrangement of saw-tooth-shaped recesses 301a which define cam surfaces is able only to move actively the supporting ring 14" rearwards, towards the hard lens 18 so that the supporting ring 14" can only ever be moved to give the membrane 15" a convex shape.

Where one or more of the locating tabs 351, 361, 371, 381 are required to be driven away from, as well as towards the hard lens 18, the saw-tooth-shaped holes 354, 364, 374, 384 may be replaced by escalator holes such as 354a, 374a shown in FIGS. 25 and 26 respectively which define opposing cam surfaces. Where the shorter tabs 14a must be driven away from hard lens 18, the saw-tooth-shaped recesses 301a can be replaced by inclined slots with opposing cam surfaces, as shown in FIG. 26.

Figure 27:
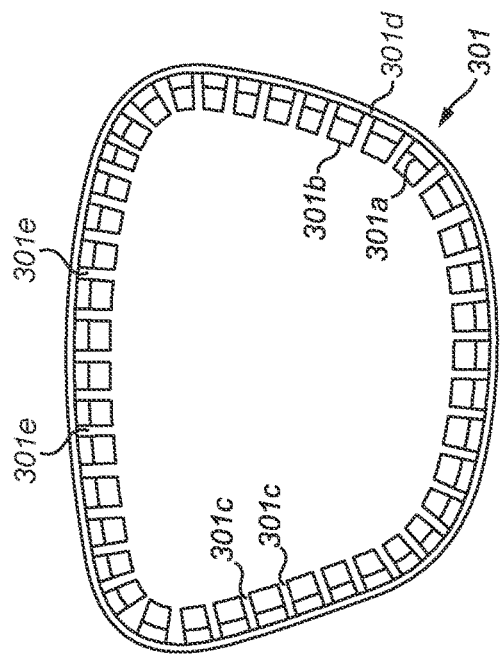
FIG. 27 is a front view of an alternative toothed belt for use in the variable focusing power fluid-filled lens assembly of the third embodiment, in which the circumferentially spaced cam surfaces are formed in separate hard inner parts attached to a flexible outer belt.
Figure 29:
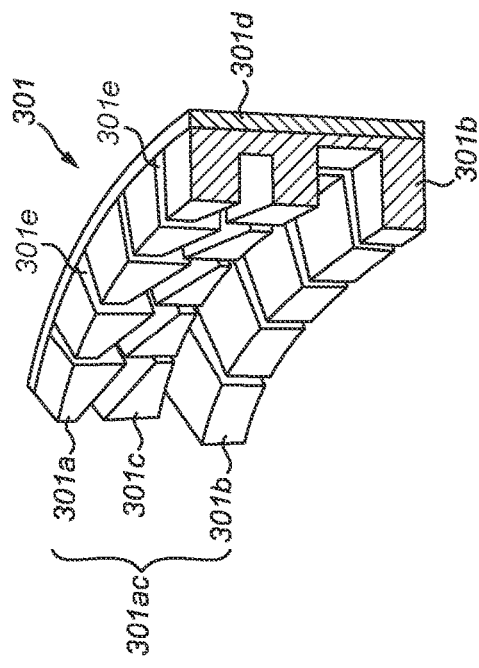
FIG. 29 is a perspective view from below and to the front of an inside of part of the toothed belt of FIG. 27.
Figure 28:
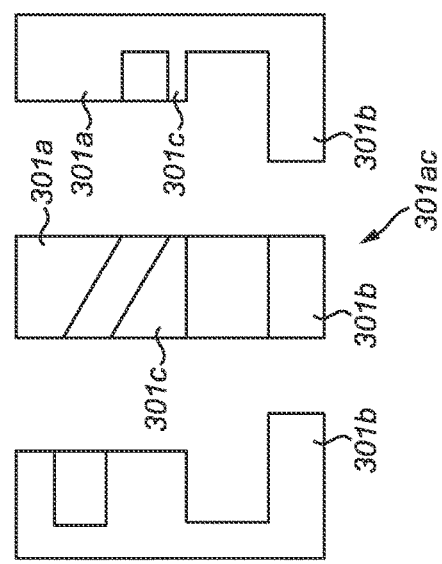
FIG. 28 shows three different views of one of the hard inner parts of the alternative toothed belt of FIG. 27 from each respective side in the azimuthal direction, and radially outwards.

FIGS. 27 to 29 show how the belt 301 is constructed for an embodiment in which the belt comprises a plurality of inclined slots 301a and four escalator holes, such as 354a, 374a. A flexible outer belt 301d has discrete inner parts 301ac attached to an inner face thereof by co-moulding, adhesive bonding or other means. The inner parts 301ac are spaced apart circumferentially of the belt 301 by a small distance 301e around the inner face of the outer belt 301d so that the inner parts 301ac do not touch one another, even in the highly curved regions of the eye shape such as the nasal region, to allow the belt to bend as required in those regions. Each inner part 301ac comprises a block of a relatively stiff material that has a low coefficient of friction such as PTFE, or another plastic with a low friction coating the surfaces that come into moving contact with other parts of the lens assembly during actuation of the support ring. The inner parts 301ac need to be relatively stiff, with a Young's modulus of typically greater than 1 GPa and preferably greater than 2 GPa so that they do not deform when actuating the tabs 14a, 351, 361, 371, 381. Each block 301ac comprises a projecting rear lip portion 301b for constraining the hard lens 18 in the z-direction, as described above, when the tabs 14a, 351, 361, 371, 381 are actuated, and two inwardly projecting block portions 301e, 301f, that are spaced apart on the z-axis and comprise opposing front and rear sloping faces that define the above-mentioned inclined slots. The outer belt 301d may be made of a flexible elastomer such as natural rubber, TPU, silicone etc.

It will be appreciated that features or subject matter described or claimed herein with reference to a variable focusing power fluid-filled lens may apply to a mirror assembly, mutatis mutandis. For example, the present disclosure includes within its scope the subject matter of any of the claims of the present application that are directed only to a variable focusing power liquid lens assembly as if they were directed to a variable focusing power fluid-filled lens or mirror assembly.

The invention claimed is:

1. A variable focusing power fluid-filled lens or mirror assembly comprising a fluid-filled envelope and a supporting structure therefor; the fluid-filled envelope being constituted by a first wall which is formed of a distensible elastic membrane having an exterior optical surface of variable curvature, a second wall which is spaced from the first wall on a z-axis which is generally perpendicular to the membrane, and a collapsible peripheral side wall which extends between the first and second walls, and being filled with a substantially incompressible fluid; a membrane holding structure which is attached to a peripheral edge of membrane for holding the membrane under tension, the membrane holding structure defining a plurality of discrete control points spaced around the peripheral edge of membrane where the position of the peripheral edge of the membrane relative to the second wall on the z-axis is controlled and permitting bending of the peripheral edge of the membrane in a plane defined by the z-axis and a tangent to the peripheral edge of the membrane; the plurality of control points including a plurality of dynamic actuation points; and an actuation mechanism for displacing the edge of the membrane on the z-axis relative to the second wall at each of the dynamic actuation points to control the shape of the membrane; wherein the actuation mechanism comprises a plurality of first cam members which are connected to the membrane holding structure and associated with respective dynamic actuation points, a cam belt disposed circumjacent to the edge of the membrane which comprises a plurality of spaced second cam members, each second cam member being engaged with a corresponding one of the first cam members for controlling the position of the edge of the membrane on the z-axis at the respective dynamic actuation point, a cam belt support which supports the cam belt for bidirectional rotation around the z-axis relative to the membrane and a coupling for drivably connecting the cam belt to a selectively operable driver; and wherein the cam belt forms a complete loop circumjacent to the edge of the membrane.

2. The variable focusing power fluid-filled lens or mirror assembly of claim 1, wherein each first cam member comprises a cam follower and each second cam member comprises at least one cam surface; the cam follower and cam surface being configured such that rotation of the cam belt causes or allows displacement of the cam follower on the z-axis.

3. The variable focusing power fluid-filled lens or mirror assembly of claim 1, wherein the cam belt comprises a plurality of cam plates which are interconnected by tension members; each cam plate comprising at least one second cam member.

4. The variable focusing power fluid-filled lens or mirror assembly of claim 1, wherein the cam belt comprises a plurality of circumferentially spaced teeth, each of which defines a respective one of the second cam members.

5. The variable focusing power fluid-filled lens or mirror assembly of claim 4, wherein the cam belt comprises a plurality of circumferentially spaced teeth which engage corresponding first cam members at substantially regular intervals around the entirety of the peripheral edge of the membrane; the spacing between adjacent teeth being sufficiently small as to minimise uncontrolled bending of the peripheral edge of the membrane therebetween.

6. The variable focusing power fluid-filled lens or mirror assembly of claim 2, wherein at least two of the cam surfaces are configured differently for causing or allowing differential displacement of the peripheral edge of the membrane on the z-axis at the corresponding actuation points.

7. The variable focusing power fluid-filled lens or mirror assembly of claim 1, wherein the supporting structure comprises a hard member which is spaced from the first wall, and wherein the hard member has a peripheral outer side surface which bears the cam belt.

8. The variable focusing power fluid-filled lens or mirror assembly of claim 1, wherein the membrane holding structure comprises a bendable support ring that defines a datum x, y-plane which is generally perpendicular to the z-axis.

9. The variable focusing power fluid-filled lens or mirror assembly of claim 8, wherein the supporting structure and bendable support ring are interconnected so as to allow displacement of the support ring on the z-axis and to prevent azimuthal rotation of the support ring about the z-axis.

10. The variable focusing power fluid-filled lens assembly of claim 1, wherein the lens assembly defines an optical axis which extends substantially orthogonally to a datum plane defined by the membrane in an undistended state; the supporting structure comprising a hard member which is spaced from the first wall, the hard member having an interior surface that forms or supports the second wall of the fluid-filled envelope; the bendable support ring comprises a plurality of actuating tabs which are placed at spaced actuation points around the periphery of the bendable support ring, each of the actuating tabs being movable towards or away from the second wall in a direction substantially parallel to the optical axis for controlling the shape of the support ring as the membrane is distended or relaxed; and the cam belt comprises a first slidable cam plate comprising one or more cam surfaces which engage with one or more first actuating tabs of the plurality of actuating tabs for operating the one or more first actuating tabs such that reciprocating movement of the first cam plate relative to the support ring causes the first actuating tabs to move towards or away from the second wall in a direction substantially parallel to the optical axis, a second slidable cam plate comprising one or more cam surfaces that which engage with one or more second actuating tabs of the plurality of actuating tabs which are located on the support ring at a location remote from the one or more first actuating tabs for operating the one or more second actuating tabs such that reciprocal movement of the second cam plate causes displacement of the one or more second actuating tabs towards or away from the second wall in a direction substantially parallel to the optical axis, and tension members extending between the first and second slidable cam plates around the periphery of the lens assembly for interconnecting the first and second slidable cam plates such that the tension members and first and second cam plates form a complete loop around the lens assembly; the arrangement being such that active displacement of the support ring at each of the actuating tabs is mechanically linked for actuation of all of the actuating tabs by a single actuator.

11. The variable focusing power fluid-filled lens assembly of claim 10, wherein two or more first actuating tabs are positioned in a temple region of the bendable support ring.

12. The variable focusing power fluid-filled lens assembly of claim 10, wherein at least one second actuating tab is positioned in the nose region of the bendable support ring.

13. The variable focusing power fluid-filled lens assembly of claim 10, wherein the first slidable cam plate is driven by a rack and pinion mechanism, in which the pinion is arranged to be driven by an electric motor, either directly or through another pinion, or by a second rack.

14. The variable focusing power fluid-filled lens assembly of claim 1, wherein the membrane holding structure comprises a bendable support ring comprising a plurality of actuating tabs which are placed at spaced actuation points around the periphery of the bendable support ring, each of the actuating tabs being movable towards or away from the second wall in a direction substantially parallel to the z-axis for controlling the shape of the bendable support ring as the membrane is distended or relaxed; and the cam belt comprises a toothed belt comprising a plurality of teeth, each tooth being arranged to engage a corresponding one of the actuating tabs and has a cam surface that is shaped to cause displacement of the corresponding actuating tab towards or away from the second wall in a direction substantially parallel to the z-axis; the arrangement being such that active displacement of the support ring at each of the actuating tabs is mechanically linked for actuation of all of the actuating tabs by a single actuator.

15. The variable focusing power fluid-filled lens assembly of claim 14, wherein the respective cam surfaces of at least two of the teeth are shaped differently from one another, so that as the toothed belt is driven around the bendable support ring, the actuating tabs are driven differentially towards or away from the second wall for controlling the shape of the bendable support ring as the membrane distends or contracts.

16. The variable focusing power fluid-filled lens assembly of claim 14, wherein one or more of the actuating tabs extend through corresponding holes formed in the toothed belt to engage with one or more cooperating structures for preventing azimuthal rotation of the bendable support ring upon operation of the toothed belt.

17. The variable focusing power fluid-filled lens assembly of claim 16, wherein one or more of the holes in the toothed belt have an escalator form having opposing cam surfaces.

18. The variable focusing power fluid-filled lens assembly of claim 17, wherein actuating tabs that do not extend through the toothed belt engage with a second inclined plane feature to be driven in a direction away from the hard member.

19. The variable focusing power fluid-filled lens assembly of claim 14, wherein one or more actuating tabs are positioned juxtaposed a temple side of the bendable support ring, and a least one actuating tab is positioned juxtaposed a nose side of the bendable support ring.

20. The variable focusing power fluid-filled lens assembly of claim 8, wherein the bendable support ring is held at a substantially fixed distance from the second wall at one or more hinge points.

21. A pair of glasses or other eyewear product comprising one or more variable focusing power liquid lens assemblies as claimed in claim 1.

22. An AR/VR headset comprising one or more variable focusing power liquid lens assemblies as claimed in claim 1.

23. An AR/VR headset comprising one or more variable focusing power liquid lens assemblies as claimed in claim 14.

24. A pair of glasses or other eyewear product comprising one or more variable focusing power liquid lens assemblies as claimed in claim 10.

25. A pair of glasses or other eyewear product comprising one or more variable focusing power liquid lens assemblies as claimed in claim 14.

26. An AR/VR headset comprising one or more variable focusing power liquid lens assemblies as claimed in claim 10.

\* \* \* \* \*